United States Patent
Matsuoka

(10) Patent No.: US 7,843,381 B2
(45) Date of Patent: Nov. 30, 2010

(54) RADAR DEVICE

(75) Inventor: Katsuji Matsuoka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 303 days.

(21) Appl. No.: 12/117,477

(22) Filed: May 8, 2008

(65) Prior Publication Data
US 2009/0322591 A1      Dec. 31, 2009

(30) Foreign Application Priority Data
Dec. 19, 2007    (JP) .............................. 2007-327410

(51) Int. Cl.
*G01S 13/08*      (2006.01)
(52) U.S. Cl. .................. 342/132; 342/105; 342/118; 342/70
(58) Field of Classification Search .................. 342/201
See application file for complete search history.

(56) References Cited

U.S. PATENT DOCUMENTS

2002/0190894 A1* 12/2002 Mitsumoto et al. ............ 342/70

FOREIGN PATENT DOCUMENTS

| JP | 5-19045 A | 1/1993 |
|---|---|---|
| JP | 8-211145 A | 8/1996 |
| JP | 9-133765 A | 5/1997 |

\* cited by examiner

*Primary Examiner*—Thomas H Tarcza
*Assistant Examiner*—Timothy A Brainard
(74) *Attorney, Agent, or Firm*—Sughrue Mion, PLLC

(57) ABSTRACT

A radar device of FM pulse system, in which a pulsed radio wave with frequency modulated is transmitted or received, to calculate a distance to a target 203 and a relative velocity, comprising: range gate setting means 205 for determining a sampling timing every time a predetermined time period has passed from a transmission timing; sampling means 206 for making a sampling in a frequency up zone or frequency down zone in each range gate; and measurement time changing means 207 for setting a measurement data used as an input of Fourier transform based on sampling data obtained by the sampling means 206, and when letting a time period required to make a sampling of all measurement data a measurement time period, changing the measurement time period in each range gate. An optimum distance resolution and relative velocity resolution can be set based on the distance to a target.

23 Claims, 21 Drawing Sheets

RADAR DEVICE

BACKGROUND OF THE INVENTION

1. Field of the Invention

The present invention relates to a radar device obtaining an optimum relative velocity resolution or distance resolution by changing a measurement time period of a measurement data in each range gate to calculate a distance to a target and a relative velocity.

2. Description of the Related Art

As one of radar devices that are mounted on vehicles, and used in an adaptive cruise control (ACC), a collision damping braking device or the like, a radar device of FMCW (Frequency Modulated Continuous Wave) system (hereinafter, referred to as a FMCW radar device) capable of detecting a distance to a target and a relative velocity at the same time has been known.

Incidentally, the FMCW system is one of transmission systems of the radar device. In this FMCW system, the distance to a target or the velocity can be obtained by calculating a difference in frequency between a transmission wave and a received wave (a reflected wave to be obtained by the transmission wave being reflected at the target).

In this FMCW radar, a transmission signal of CW (Continuous Wave) radar is subjected to FM modulation. An arrangement of the conventional FMCW radar is illustrated in FIG. 22.

FIGS. 23(*a*) and (*b*) are graphic diagrams for explaining an operation principle of the conventional FMCW radar. FIG. 23(*a*) illustrates a case where the relative velocity with respect to a target is 0, while FIG. 23(*b*) illustrates another case where the relative velocity is present.

When the frequency of an oscillator 312 is modulated with a triangular wave from a modulated signal generator 311 and radiated to the outside from a transmission antenna 314, the relationship between the frequency of the transmission signal and time is as indicated by the solid line in FIG. 23.

Whereas, the signal, being the transmission signal reflected at the target and received by a receiving antenna 315 undergoes a time delay due to the distance and a frequency deviation corresponding to the relative velocity.

When the relative velocity with respect to the target is 0, the signal (received wave) to be received at the receiving antenna 315 undergoes only the time delay, to be as indicated by the dot line in FIG. 23(*a*).

In the case where the relative velocity is present, as indicated by the dot line in FIG. 23(*b*), the signal (received wave) that is received at the receiving antenna 315 is superimposed with a Doppler frequency due to the movement of the target (FIG. 23(*b*) illustrates the case where the target approaches).

Incidentally, in FIG. 23, "τ" is a time difference between a transmission wave and a reflected wave, "ΔF" is a modulation width, "Tm" is a measurement time period, and "fm" is a modulated frequency.

As illustrated in FIG. 22, when this signal (that is, the signal, being the transmission signal reflected at the target and received by the receiving antenna 315) is mixed by a mixer 316 with a part of the transmission signal having been fetched out through a directional coupler 313, a beat signal can be obtained. Incidentally, reference numeral 317 designates an amplifier to amplify the beat signal from the mixer 316.

In case where the target moves, the beat frequency, in each modulation cycle (that is, in respective zones of the later-described "up phase" and "down phase"), is changed as expressed by the following equations (1) and (2).

$$U = fr - fd \quad (1)$$

$$D = Fr + fd \quad (2)$$

where: U is a beat frequency in a frequency up zone (up phase), D is a beat frequency in a frequency down zone (down phase), fr is a beat frequency when the relative velocity is 0, and fd is a Doppler frequency based on the relative velocity.

Accordingly, in case where the beat signals U and D are measured in each cycle of modulation, the distance R to the target and the relative velocity V can be obtained as expressed by the following equations (3) and (4), fr, fd.

$$Fr = (U+D)/2 (\propto R) \quad (3)$$

$$Fd = (D-U)/2 (\propto V) \quad (4)$$

In this connection, a specific way of calculating the distance R to the target and the relative velocity V is now described.

As expressed by the equations (1) and (2), in the beat frequency (U) that is observed in the up phase and the beat frequency (D) that is observed in the down phase, there are included both the frequency fr to be determined by the distance R to the target and the frequency fd to be determined by the relative velocity of the target, and the equations (1) and (2) can be thought to be simultaneous equations including unknowns fr and fd.

Thus, with the beat frequencies U and D having been observed, fr and fd can be obtained, and the distance R and the relative velocity V can be obtained by the below-mentioned equations from these fr and fd.

$$R = ((c/4) \times \Delta F \times fm) \times fr$$

$$V = (c/2f0) \times fd$$

where: c is a radio wave propagation speed (3×108 m/s), and f0 is a carrier frequency.

Incidentally, the above-mentioned technique is a generally known in the FMCW radar device, and corresponds to a publicly well-known technique, so that any particular prior art document is not disclosed herein.

In the above-described known FMCW radar device, however, in the case where a plurality of targets is present, a beat signal is generated with respect to each of the plurality of targets, thus making it hard to know a correspondence relationship between each beat signal and each target.

To meet this, a radar device has been disclosed and in which by changing a modulated frequency (fm) based on the distance to a target, the relative velocity of the target can be detected with high accuracy in the short distance, as well as it becomes easy to determine the correspondence between a plurality of targets and beat signals in the long distance (for example, see the Japanese Patent Publication (unexamined) No. 211145/1996)

That is, it is disclosed in the Japanese Patent Publication (unexamined) No. 211145/1996 that the modulated frequency (fm) is changed based on the distance to the target. More specifically, it is described such that "when a target is present in the short distance, by making fm smaller to make the relative velocity frequency relatively large, the relative velocity of the target can be detected with high accuracy; and when the target is present in the long distance, by making fm larger to make the relative velocity frequency relatively small, it comes to be easy to determine the correspondence between plurality of targets and beat signals".

In the mentioned Japanese Patent Publication (unexamined) No. 211145/1996, however, the effective use of the radar device is achieved only on condition that the distance measurement results by means of the radar is correct. In the case where the beat signal is erroneously treated, and any error is made in the calculation of distance and relative velocity, setting of the modulated frequency (fm) will not be optimal.

That is, to correctly calculate the distance and the relative velocity of a target from the mentioned equations (3) and (4), the beat frequency U that is observed in the up phase and the beat frequency D that is measured in the down phase both need to be the beat frequency that is generated from the reflected wave from the same target. However, in the case where there is a plurality of targets, a plurality of beat frequencies will be observed in each phase.

Therefore, supposing that the combined U and D are of the same target, the distance and the relative velocity can be correctly calculated. Supposing that, however, any error is made in the combination of U and D, false distance and relative velocity will be calculated, and thus a problem exists in that setting of the modulated frequency (fm) is not optimal.

Moreover, in the case where the beam width of a radio wave to be transmitted from the transmission antenna is rather large, there are some cases in which both the target in the short distance and the target in the long distance are detected at the same time. In the case where the modulated frequency (fm) for the short distance is set, as to a target in the long distance, another problem exits in that the correspondence relationship of a beat frequency between in the up phase and in the down phase is less likely to determine.

SUMMARY OF THE INVENTION

The present invention was made to solve the above-mentioned problems, and has an object of providing a radar device obtaining an optimum distance resolution or relative velocity resolution both in the case of a short distance to a target and in the case of a long distance thereto.

The present invention is a radar device of FM pulse system including: frequency modulation means for making a frequency modulation of a frequency of a transmission radio wave with a modulation signal of a triangular wave; transmission means for generating a pulsed signal of which frequency has been modulated by the mentioned frequency modulation means, and transmitting the pulsed signal to a target as a transmission pulse signal; receiving means for receiving a signal having been reflected at the mentioned target as a received pulse signal, and generating a beat signal from a frequency difference between a part of the transmission radio wave of which frequency has been modulated and the received pulse signal; and distance and relative velocity calculation means for calculating a distance to the mentioned target and a relative velocity with the beat signal generated by the mentioned receiving means; the radar device comprising:

range gate setting means for setting a range gate that determines a sampling timing of the mentioned received pulse signal at intervals of a predetermined time period based on a transmission timing of the mentioned transmission pulse signal;

sampling means for sampling the mentioned received pulse signal in a frequency up zone or in a frequency down zone of the mentioned frequency modulated signal in each range gate set by the mentioned range gate setting means; and measurement time changing means for setting a measurement data used as an input of Fourier transform based on sampling data obtained by the mentioned sampling means, and when letting a time period required to make a sampling of all measurement data a measurement time period, changing the mentioned measurement time period in each range gate.

In the present invention, the range gate means for determining a sampling timing every time a predetermined time period has passed from the transmission timing is provided, and by changing a measurement time period in each range gate, an optimum distance resolution and relative velocity resolution can be set based on the distance to a target.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
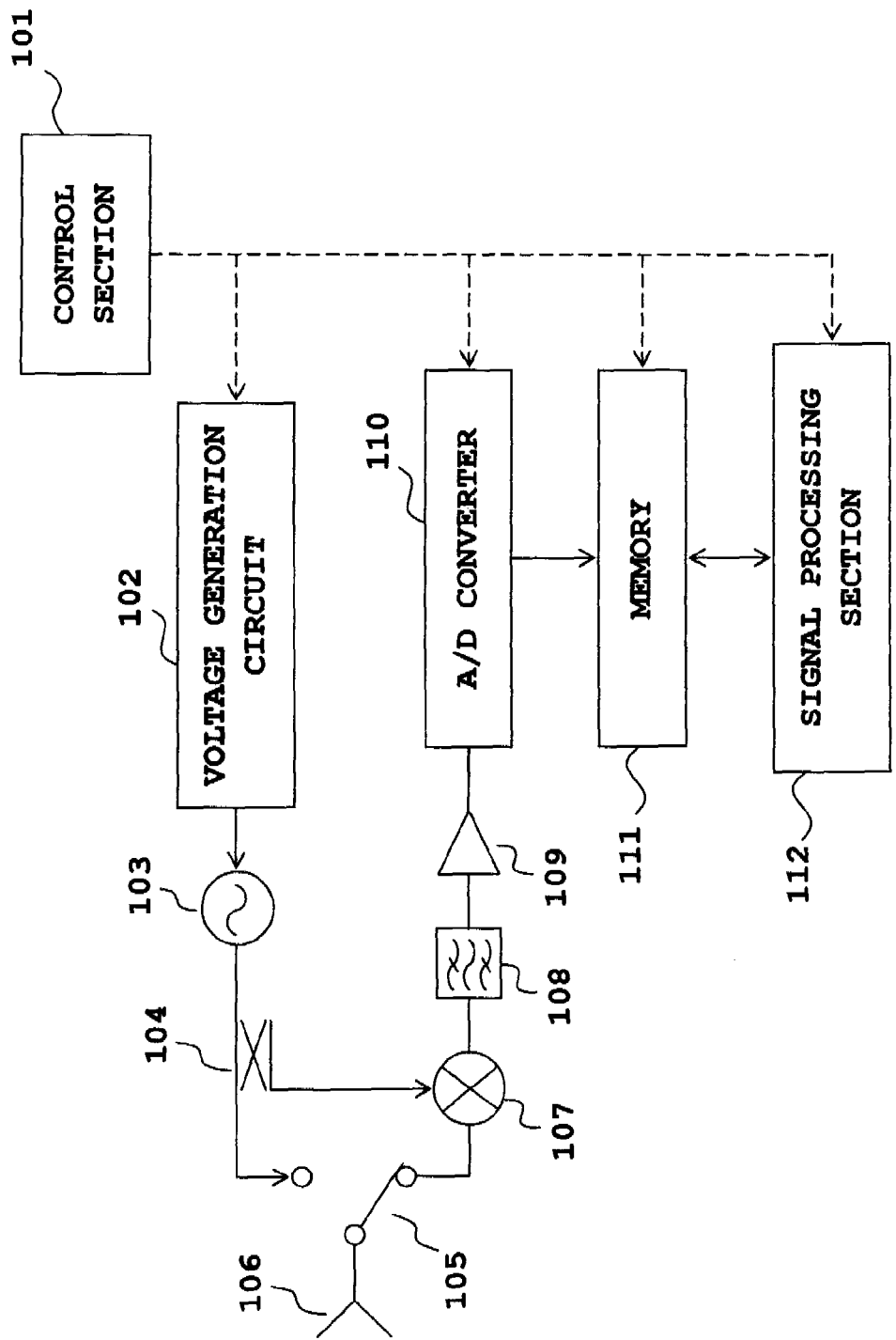
FIG. 1 is a schematic diagram illustrating an arrangement of a radar device according to a first exemplary embodiment of the present invention.

Now referring to the drawings, an exemplary embodiment according to the present invention is hereinafter described.

FIG. 1 is a schematic diagram illustrating an arrangement of a radar device according to a first embodiment of the invention.

With reference to FIG. 1, reference numeral 101 designates a control section, numeral 102 designates a voltage generation circuit, numeral 103 designates a voltage controlled oscillator (VCO: Voltage Controlled Oscillator), numeral 104 designates a distributor, numeral 105 designates a switch, numeral 106 designates a transmitting/receiving antenna, numeral 107 designates a mixer, numeral 108 designates a band pass filter, numeral 109 designates an amplifier, numeral 110 designates an analog/digital (A/D: Analog to Digital) converter, numeral 111 designates a memory, and numeral 112 designates a signal processing section.

FIGS. 2(a) to (e) are graphic charts for explaining the operation of the radar device according to this embodiment. With reference to FIGS. 1 and 2(a) to (e), the operation of the radar device according to this embodiment is hereinafter described.

Figure 2:
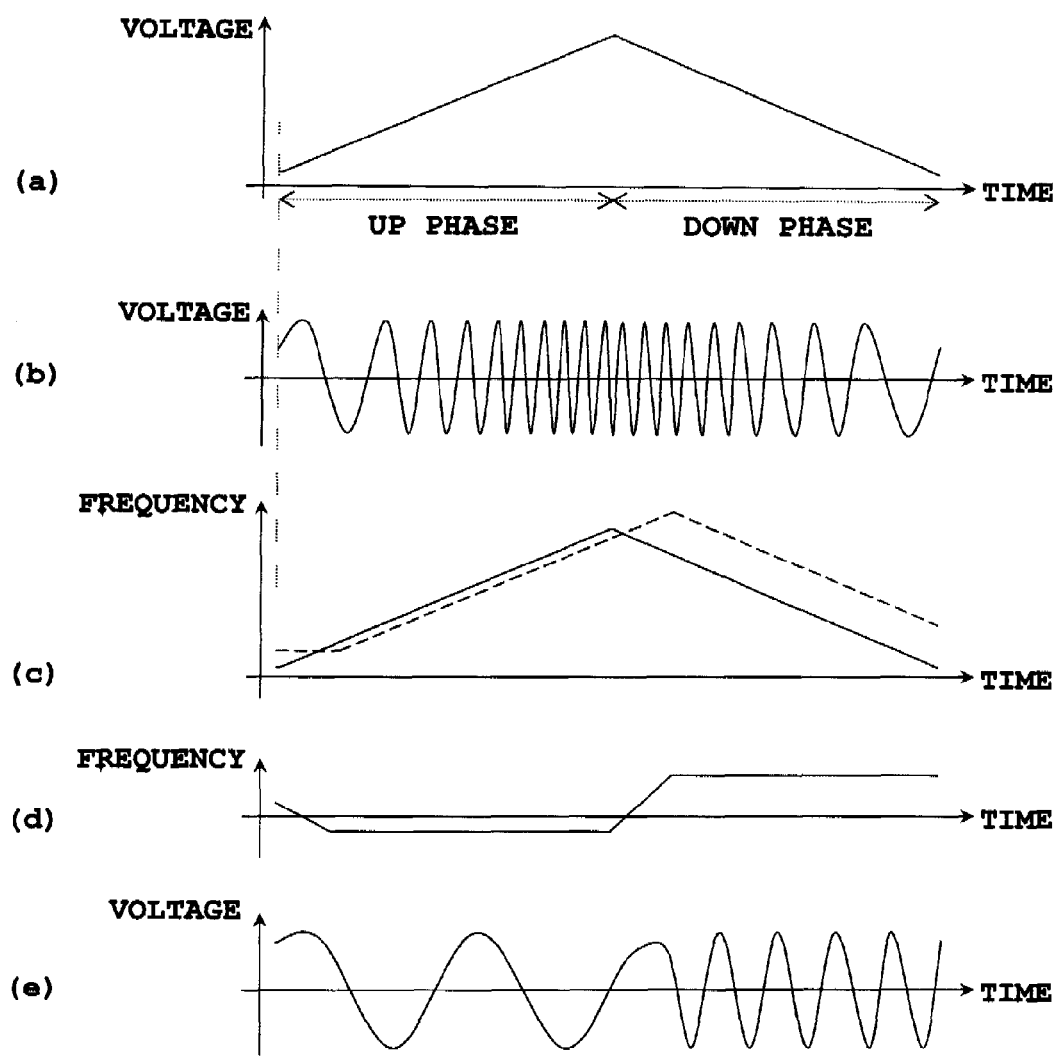
FIGS. 2(a) to (e) are graphic diagrams for explaining operation of the radar device according to the first embodiment.

First, the voltage generation circuit 102 of which timing and the like are controlled by the control section 101 generates a "voltage changing in a triangular wave shape over time" illustrated in FIG. 2(a) and applies the voltage to a VCO (voltage controlled oscillator) 103.

The VCO 103, based on the voltage having been applied, generates a frequency modulated continuous wave (FMCW) of which frequency is changed over time, and outputs it to the distributor 104.

FIG. 2(b) illustrates the "frequency modulated continuous wave (FMCW) of which frequency is changed over time" to be outputted to the distributor 104.

The distributor 104 outputs to the switch 105 a part of FMCW having been inputted as a transmission signal and also outputs to the mixer 107 the remaining FMCW as a local signal.

The switch 105 carries an electric current through the transmitting/receiving antenna 106 only for a predetermined time period in a predetermined timing, and radiates a pulse-like transmission signal into the space.

The switch 105 is switched to the receiving side after a predetermined time period has passed.

A reflected wave from a target is received by the transmitting/receiving antenna 106, to be a received signal (indicated by a dot line) of FIG. 2c. (Illustration of the state of being pulsed is omitted.)

Thereafter, the received signal is outputted to the mixer 107 via the switch 105.

The mixer 107 is inputted with the received signal and a local signal (indicated by a solid line) of FIG. 2(c) outputted by the distributor 104 to make mixing, and generates a beat signal.

In terms of this beat signal, the frequency change with the lapse of time is illustrated in FIG. 2(d) and the voltage change with the lapse of time is illustrated in FIG. 2(e).

The beat signal having been generated at the mixer 107, after an unnecessary frequency component thereof has been removed by a band pass filter, is amplified by the amplifier 109 band and outputted to the A/D converter 110.

The A/D converter 110 is inputted with the beat signal by the control section 101 in synchronization with a measurement time period of an up phase or a down phase of FIG. 2(a), and outputs the beat signal to the memory 111 as a digital voltage value.

The signal processing section 112 is formed of, for example, CPU (Central Processing Unit), or CPU and DSP (Digital Signal Processor). This signal processing section 112, by the control section 101, at a time point when the measurement time period in the up phase or in the down phase of FIG. 2(a) is ended, is inputted with the digital voltage value of the beat signal in the up phase or the digital voltage value of the beat signal in the down phase, calculates the distance to a target, the relative velocity, or the angle thereof, and outputs the calculation results to the other device.

Figure 3:
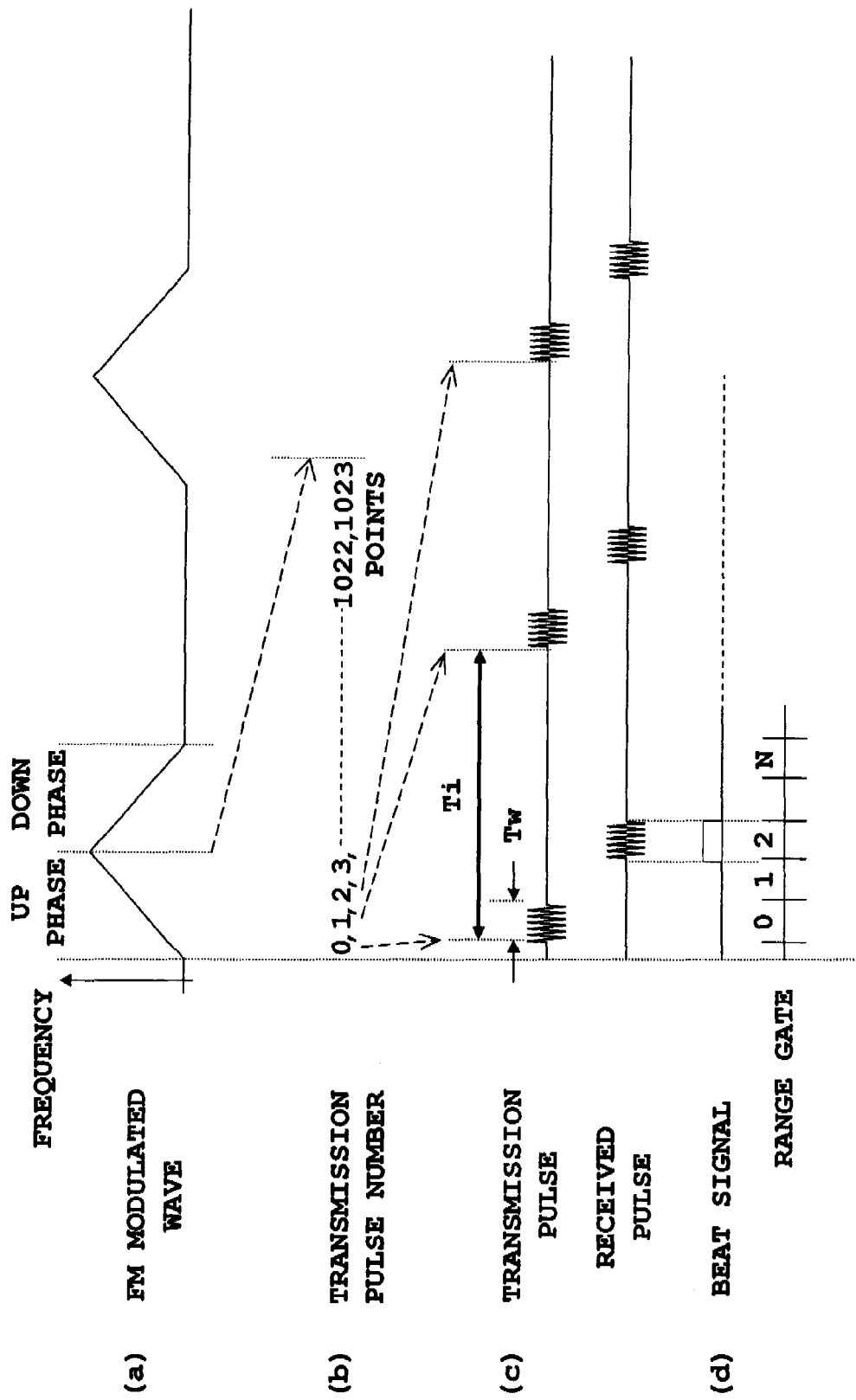
FIGS. 3(a) to (d) are diagrams for explaining a timing of each signal in the radar device according to the first embodiment.

FIGS. 3(a) to (d) are diagrams for explaining timing of each signal of the radar device according to this embodiment, and the timing of each signal is now described in detail referring to FIG. 3.

FIG. 3(a) indicates FMCW to be outputted from VCO 103. With reference to FIG. 3, descriptions are made focused on the up phase of this FMCW.

As illustrated in FIG. 3(b), in the up phase, 1024 times of pulses are transmitted.

As illustrated in FIG. 3(c), a transmission pulse is transmitted with a pulse width Tw and at a pulse period Ti. Further, in response to each transmitted pulse, a reflected wave is received from a subject (that is, the target).

On the receiving side, as illustrated in FIG. 3(d), a range gate (0 to N) is set, and a beat signal is sampled in each range gate.

Incidentally, the range gate (Range Gate) is an element to determine the timing of sampling of a received pulse to be reflected after a transmission pulse has been transmitted.

The timing of sampling of the received pulse is set at the control section 101 illustrated in FIG. 1, and in this timing having been set, the received signal is A/D converted by the A/D converter 110.

Figure 4:
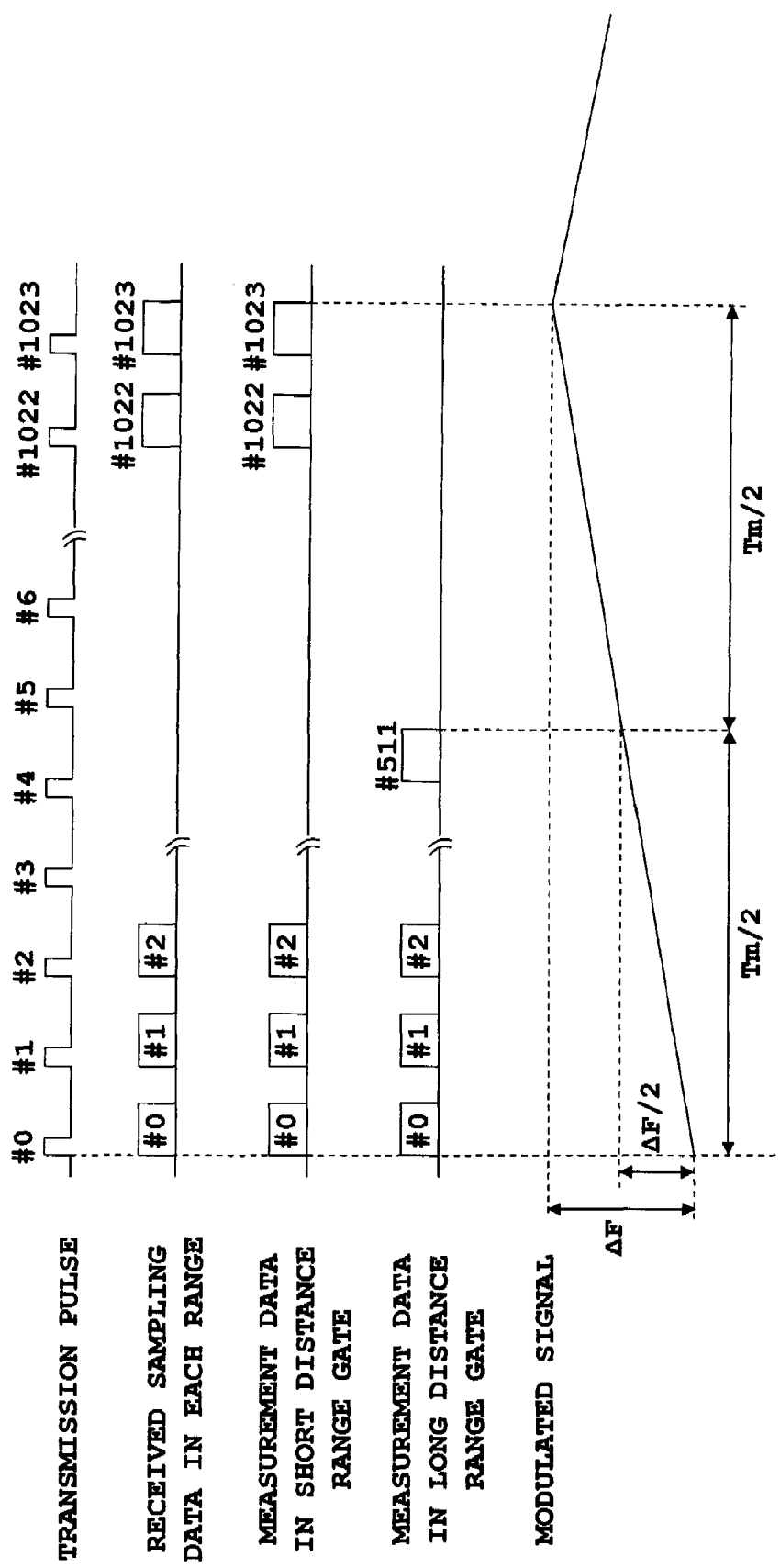
FIG. 4 is a diagram illustrating the relationship between a measurement data and a modulated signal in each range gate in the first embodiment.

FIG. 4 illustrates the relationship between a measurement data in each range gate (that is, data for measuring a distance to a target or a velocity of the target) and a modulated signal.

In this example, the range gates are largely divided into two parts of a short distance range gate and a long distance range gate. For example, the range gates 0, 1 can be the short distance range gage, and the range gates 2 to N can be the long distance range gate. In addition, the case of the up phase is illustrated in FIG. 4.

Incidentally, the data #0, #1, . . . #1023 illustrated in FIG. 4 corresponds to points of transmission pulses 0, 1, . . . 1023 illustrated in FIG. 3.

As illustrated in FIG. 4, in the short distance range gate, the sampling data (#0 to #1023) that are obtained all over the up phase is used as a measurement data, and in the long distance range gate, the sampling data (#0 to #511) in the range half that of the up phase is used as a measurement data.

As a result, in the short distance range gate, the measurement time period is Tm and the modulation width is $\Delta F$; and in the long distance range gate, the measurement time period is Tm/2 and the modulation width is $\Delta F/2$.

As described in descriptions of the related art, in the case where the target moves, the beat frequency can be expressed as follows:

$$U = fr - fd \quad (1)$$

$$D = Fr + fd \quad (2)$$

where: U is a beat frequency in the zone where a frequency rises (up phase), D is a beat frequency in the zone where a frequency drops (down phase), fr is a beat frequency when the relative velocity is 0, and fd is a Doppler frequency based on the relative velocity.

Accordingly, in case of individually measuring the beat signals U and D in each cycle of modulation, fr, fd and the distance R to the target and the relative velocity V can be obtained as expressed in the following equations (3) and (4):

$$fr = (U+D)/2 (\propto R) \quad (3)$$

$$fd = (D-U)/2 (\propto V) \quad (4)$$

The distance R to the target and the relative velocity V, when expressing the equations (3) and (4) in detail, can be expressed as follows:

$$R = (cTm/2\Delta F) \times fr \quad (5)$$

$$V = (c/2fc) \times fd \quad (6)$$

where: c is the velocity of light, Tm is a measurement time period in each phase, $\Delta F$ is a modulation width, and fc is a carrier frequency.

Now, taking into consideration that the frequency of a beat signal that is obtained in each phase is determined using FFT (First Fourier transform), the stride of a frequency after FFT (hereinafter, referred to as a frequency bin) is determined by the measurement time period (Tm) and given as 1/Tm.

The distance resolution $\Delta R$ and the relative velocity resolution $\Delta V$ can be thought to be the distance and the relative velocity per frequency bin (bin), so that they can be expressed in the following equations (5) and (6):

$$\Delta R = (cTm/2\Delta F) \times (1/Tm) = c/2\Delta F \quad (7)$$

$$\Delta V = (c/2fc) \times (1/Tm) \quad (8)$$

Incidentally, the equation (7) is the one that is obtained by substituting the frequency (=1/Tm) per bin into fr of the equation (5), and the equation (8) is the one that is obtained by substituting the frequency per bin (=1/Tm) into fd of the equation (6).

From the equations (7) and (8), the larger the modulation width ($\Delta F$) is, the higher the distance resolution ($\Delta R$) is; and the longer the measurement time period is, the higher the relative velocity resolution ($\Delta V$) is.

That is, in the short distance range gate, the distance resolution and the relative velocity resolution are set to be high, thus enabling to improve the distance accuracy or the relative velocity accuracy in the short distance.

Whereas, in the long distance range gate, a lower distance resolution and relative velocity resolution are set.

Now, the range of be beat frequency is described.

As an example, when FFT points are set to be 512, $\Delta F = 150$ [MHz], Tm=7 [ms], fc=76.5 [GHz], and c=3×108 [m/s], the distance resolution $\Delta R$ and the relative velocity resolution $\Delta V$ are as follows:

$$\Delta R = 1 \text{ [m] and } \Delta V = 1 \text{ [km/h]}.$$

The beat signal to be input to FFT is a real number, so that the spectrum to be transformed by FFT is to be symmetrical about 0 Hz.

Thus, in the case of FFT being 512 points, the frequency bins of 0 to 255 will be effective.

Figure 5:
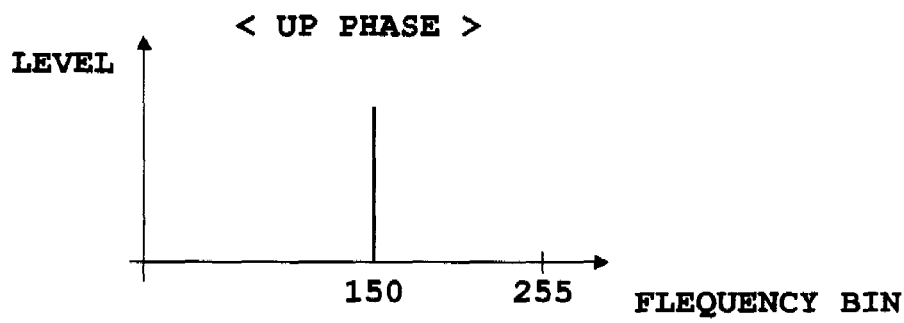
FIG. 5 is graphic diagrams for explaining a behavior of a beat frequency in the first embodiment.
Figure 5:
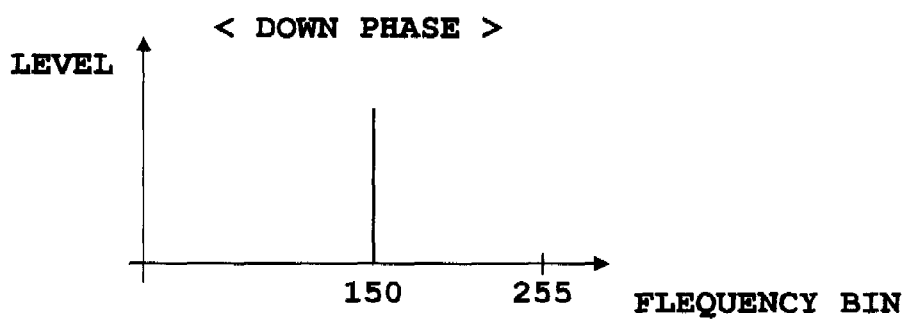

For example, when "there is a target of R=150 m and V=0 km/h", the frequency bin corresponding to the target in the up phase and in the down phase will be as follows (refer to FIG. 5):

$$U\text{bin}=150, D\text{bin}=150$$

As another example, in the case of a target approaching at R=200 m and V=150 km/h, $$U\text{bin}=50, D\text{bin}=160.$$

Figure 6:
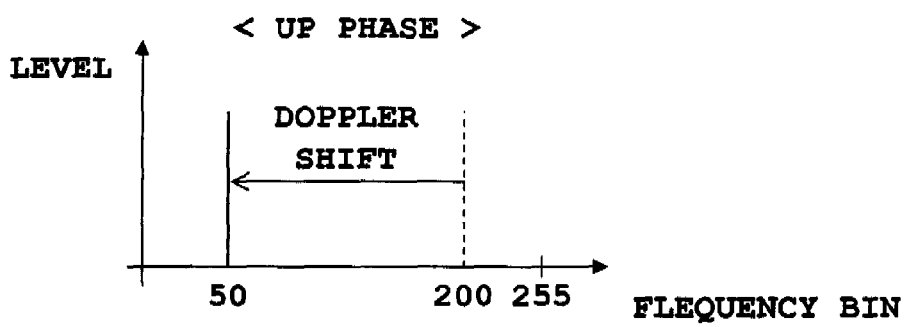
FIG. 6 is graphic diagrams for explaining a behavior of a beat frequency in the first embodiment.
Figure 6:
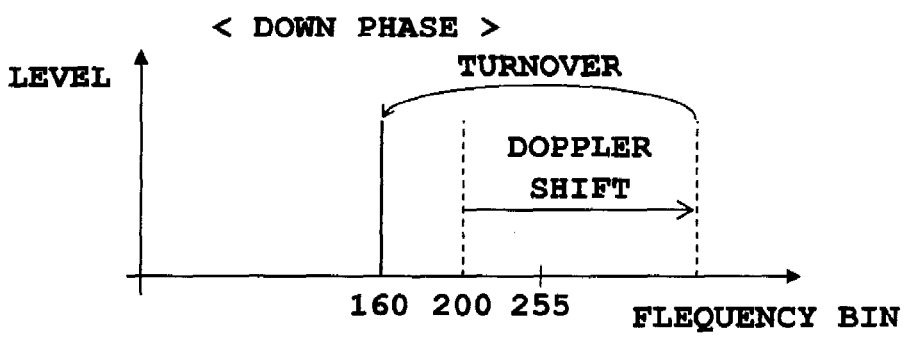

Dbin appears in the position of turnover with 255 bin a reference (see FIG. 6).

This turnover phenomenon is hereinafter referred to as a range over.

In such a case, since it cannot be determined whether Dbin is positioned at 160 bin by turnover or it is originally positioned at 160 bin, the processing on the supposition of both of them will be required. Thus, the processing load comes to be higher, which is not desirable.

To prevent the range over, it is effective to set a lower distance resolution $\Delta R$ and relative velocity resolution $\Delta V$.

For example, when FFT points are set to be 512, $\Delta F = 75$ [MHz], Tm=3.5 [ms], fc=76.5 [GHz] and c=3×108 [m/s], $$\Delta R = 2 \text{ [m]}, \Delta V = 2 \text{ [km/h]}.$$

In the case of a target of approaching at R=200 m and V=150 km/h, Ubin=25 and Dbin=175, thus enabling to prevent the range over.

As illustrated in FIG. 4, in this embodiment, in the long distance range gate, the measurement time period is Tm/2 and the modulation width is $\Delta F/2$, so that setting in which the range over is unlikely to occur is made.

Furthermore, the correspondence relationship between beat signals comes to be easy to determine.

Figure 7:
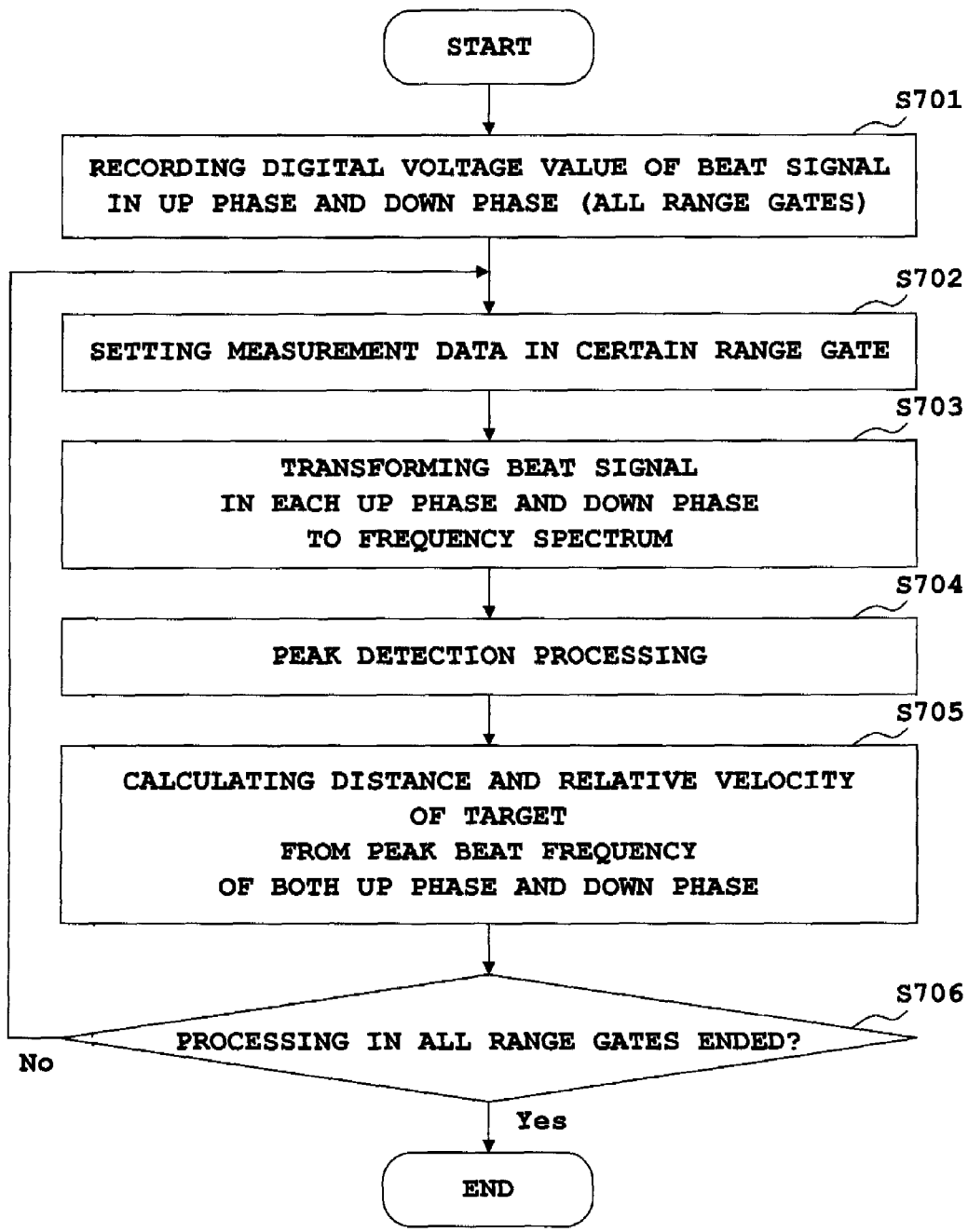
FIG. 7 is a flowchart for explaining a signal processing in the first embodiment.

Now, the flow of a signal processing is described for each step using a flowchart of FIG. 7.

First, in Step S701, in the timing described in FIG. 3, a beat signal in the up phase and in the down phase is sampled in each range gate, and the digital voltage value thereof is recorded.

Subsequently, in Step S702, for a certain range gate, data to be used for actual measurement (measurement data) is set.

That is, as illustrated using FIG. 4, for example, in the short distance range gate (0, 1), a digital voltage value data (#0 to #1023) that is obtained all over the phase region is to be a measurement data.

In addition, in the case of the other long distance range gate (2 to N), a digital voltage value data (#0 to #511) that is obtained in the range half the phase is set to be a measurement data.

In Step S703, with respect to the measurement data having been set in Step S702, for example, FFT (Fast Fourier Transform) is applied, to transform it to a frequency spectrum.

In this step, for frequency transform, DFT (Discrete Fourier transform) may be preferably used.

In Step S704, the amplitude or the electric power of the frequency spectrum having been obtained in Step S703 is calculated, and a detection threshold by assuming a predetermined false alarm rate is set. The frequency having a larger amplitude or electric power than the detection threshold is to be a peak beat frequency. Alternatively, it is preferable to let the frequency that is larger than the detection threshold as well as is the maximum value a peak beat frequency.

That is, in Step S704, the peak detection processing of a beat frequency is executed.

In Step S705, the distance from the peak beat frequency in both up phase and down phase to the target and the relative velocity are calculated.

Since the range gate is set to be within a predetermined distance range, it is checked whether the distance having been calculated is within the distance range of the range gate of observation. In the case of being within the range, a formal registration as an object is made; and in the case of being out of the range, no registration is made.

In Step S706, over all range gates, it is checked whether or not the processing is ended (completed). In the case of not being ended, the operation goes to S702; and in the case of being ended, the processing comes to end.

As described above, according to this embodiment, the measurement time period can be changed in each range gate, and the measurement time period is set to be long in the short distance range gate and the measurement time period is set to be short in the long distance range gate, so that the optimum distance resolution and relative velocity resolution can be obtained both in the short distance and in the long distance.

In particular, as a result that the distance resolution and the relative velocity resolution in the short distance is set to be high, the improvement in distance accuracy and relative velocity accuracy can be achieved.

Figure 8:
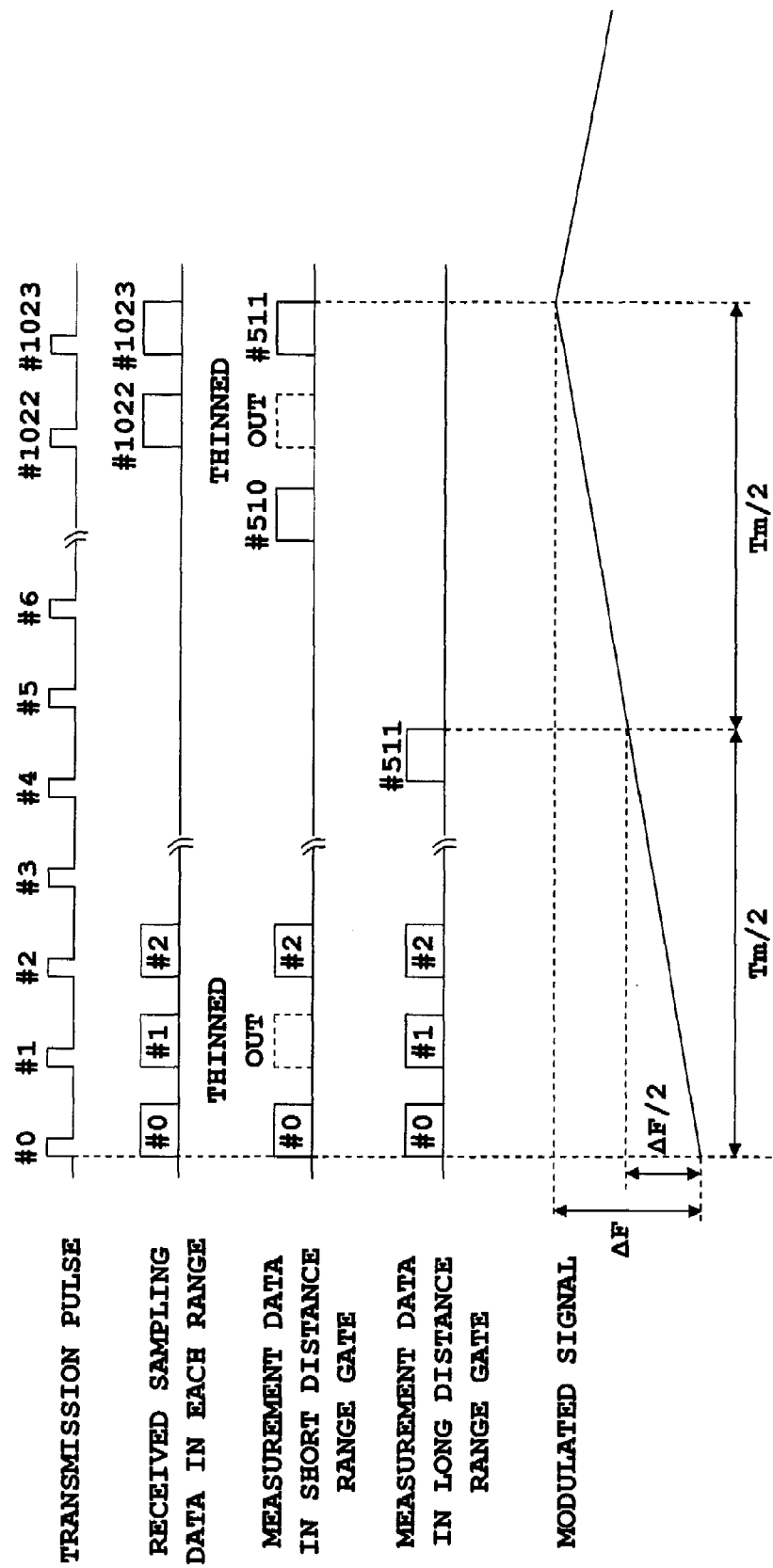
FIG. 8 is a diagram illustrating another example of the relationship between a measurement data and a modulated signal in the first embodiment.

Furthermore, as illustrated in FIG. 8, at the time of setting a measurement data in the short distance range gate, the digital voltage value data (#0 to #1023) having been obtained all over the phase region may be thinned out, to be used as the measurement data (#0 to #511).

In this case, in the short distance range gate, the number of FFT points can be reduced from 1024 points to 512 points, so that the processing load can be reduced.

Figure 9:
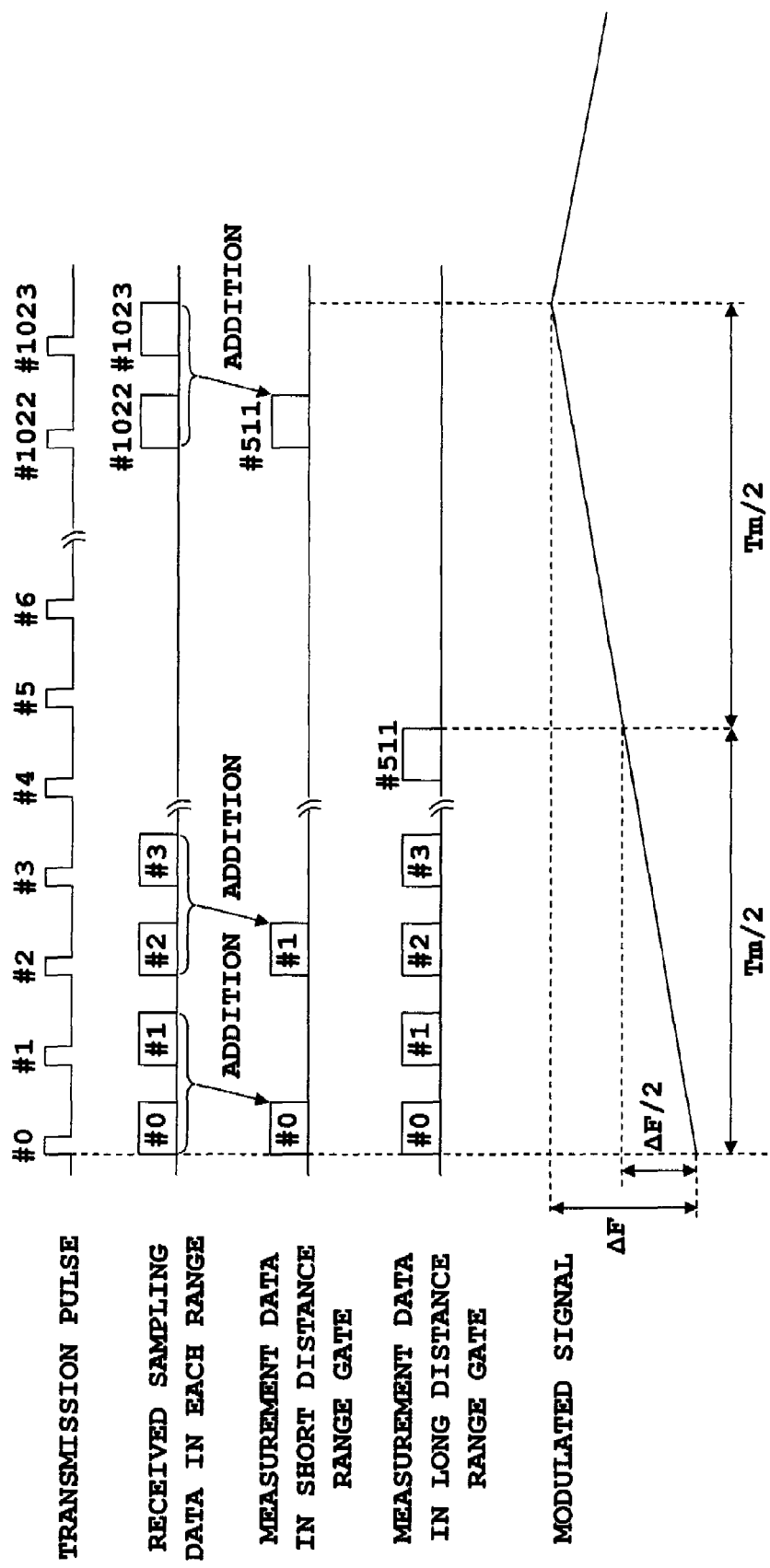
FIG. 9 is a diagram illustrating another example of the relationship between a measurement data and a modulated signal in the first embodiment.

In addition, as illustrated in FIG. 9, at the time of setting the measurement data of the short distance range gate, it is preferable that an addition of plural numbers of digital voltage value data (#0 to #1023) having been obtained all over the phase region is made to be combined (in the case of this chart, the addition of two data is made), to be used as the measurement data (#0 to #511).

In this case, as mentioned above, the number of FFT points can be reduced from 1024 points to 512 points, so that the processing load can be reduced.

Moreover, the addition processing of data is made, so that signal to noise ratio (SNR) can be improved.

Furthermore, to reduce the processing load, it is desired to employ FFT for frequency transform. Therefore, it is preferable that the number of measurement data is 2n (n is a natural number).

In this embodiment, the number of measurement data in the short distance range gate is 1024.

In addition, at the time of setting the measurement time period of the long distance range gate, it is desired to be 1/2n (n is a natural number) the measurement time period of the short distance range gate.

As in this embodiment, when the measurement time period of the long distance range gate is 1/2 the measurement time period of the short distance range gate, letting the number of all sampling data (digital voltage value data) in the phase 1024, in the case where the measurement data of the short distance range gate is #0 to #1023, the measurement data of the long distance range gate will be #0 to #511.

At this time, with respect to the measurement data of the long distance range gate, FFT can be executed, thus enabling to reduce the processing load.

Furthermore, at the time of setting a measurement data, it is preferable to make a setting using a sampling data at the central section of the phase as a reference.

Figure 10:
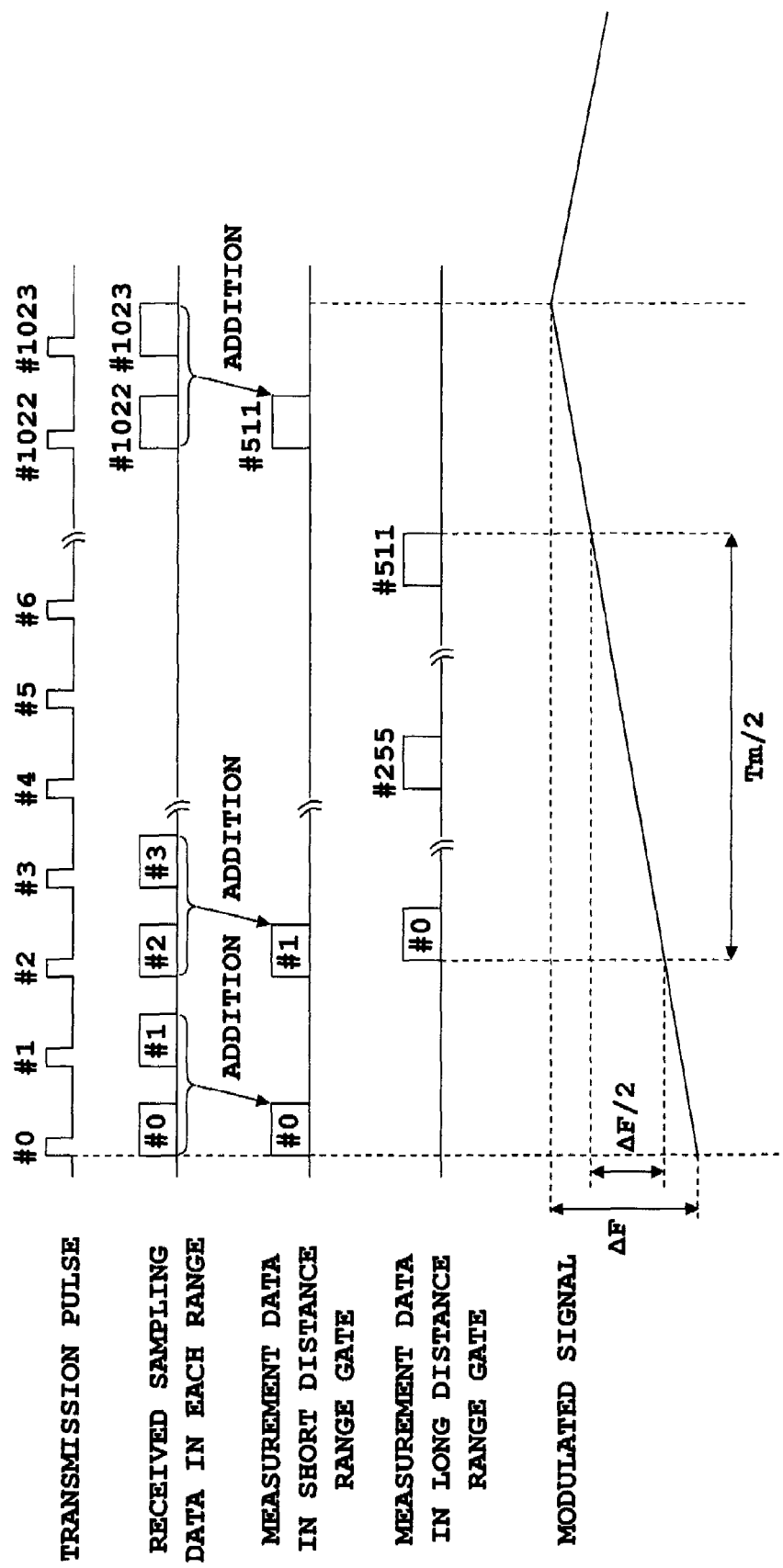
FIG. 10 is a diagram illustrating another example of the relationship between a measurement data and a modulated signal in the first embodiment.

FIG. 10 illustrates an example of setting the measurement data of the long distance range gate using the sampling data at the central portion of the phase as a reference.

As in this embodiment, although in the case of FM system, generally a triangular wave is used as a modulated signal, due to characteristics of VCO (voltage controlled oscillator), the gradient of the phase cannot be fully a straight line.

In particular, it is often the case that linearity at both phase ends is low. Thus, in the case of a low linearity at both phase ends, when FFT is executed using data in the vicinity thereof, the spectrum is broadened. Thus, not only the resolution of a frequency is damaged, but also the level of signal is decreased, thus leading to the reduction in detection performance.

Accordingly, as data of the phase, it is desired to use preferentially the data in the vicinity of the center of the phase.

Figure 11:
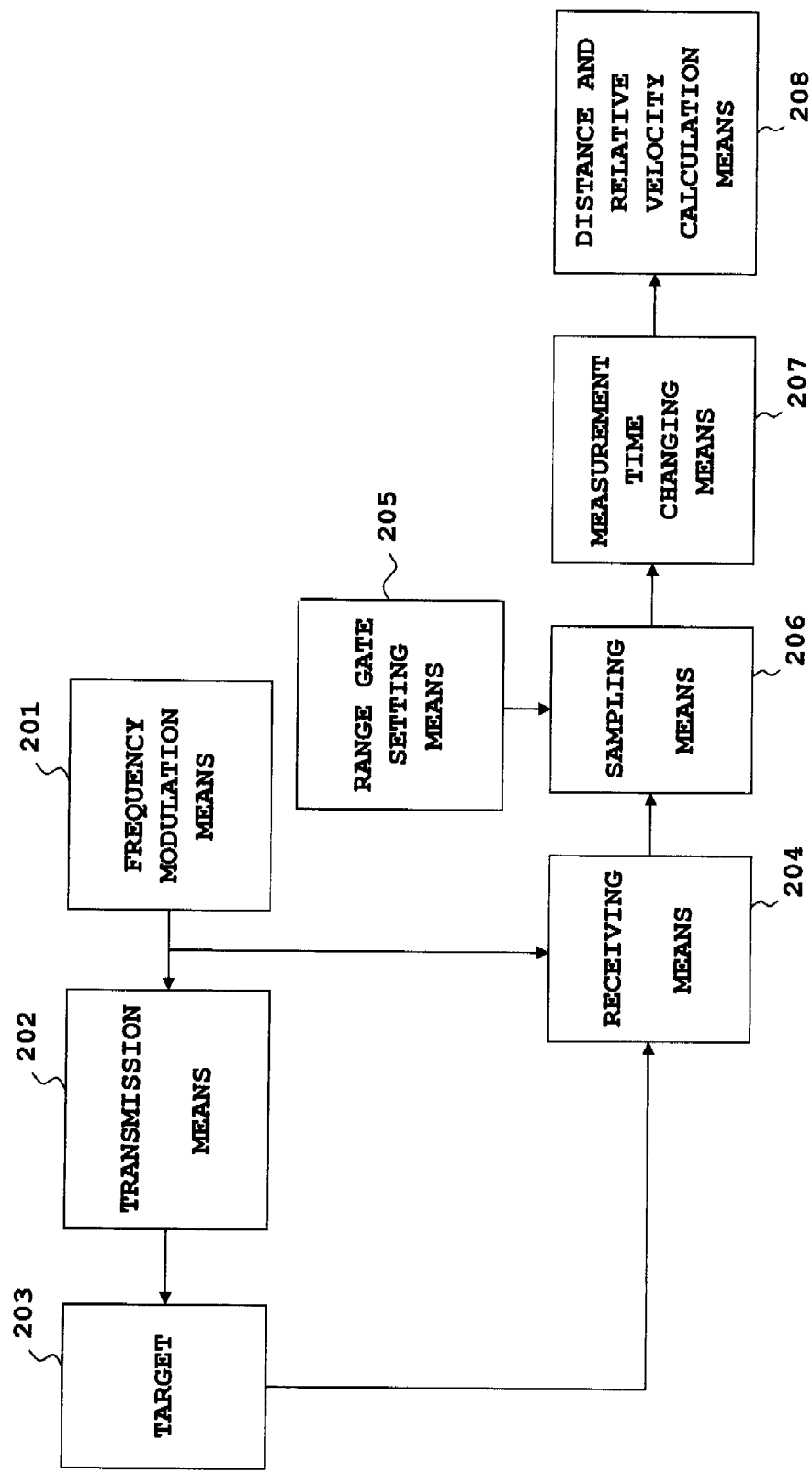
FIG. 11 is a flow diagram for explaining the concept of the invention of the radar device according to the first embodiment.

FIG. 11 is a diagram for explaining the concept of the invention of the radar device according to the above-described first embodiment. Each means illustrated in FIG. 11 is described in association with those of FIG. 1.

Frequency modulation means 201 generates a triangular wave at the voltage generation circuit 102 (refer to FIG. 1) in response to a timing signal from the control section 101 illustrated in FIG. 1, and generates a frequency modulated wave with the VCO (Voltage Controlled Oscillator) 103 (refer to FIG. 1). That is, the frequency modulation means 201 makes a frequency modulation of the frequency of a transmission radio wave with a triangular modulation signal.

Transmission means 202 produces a pulsed frequency modulated wave to be outputted from the frequency modulation means 201 and transmits it to a target 203. That is, the transmission means 202 produces a pulsed signal of which frequency has been modulated by the frequency modulation means 201 and transmits it to the target 203 as a transmission pulse signal.

Receiving means 203 receives the signal having been reflected at the target 203 as a received pulse signal, and generates a beat signal between a part of the transmission radio wave of which frequency has been modulated and a received pulse signal using the mixer 107 (refer to FIG. 1). That is, the receiving means 204 receives the signal having been reflected at the target 203 as a received pulse signal, and generates a beat signal based on a frequency difference between a part of the transmission radio wave of which frequency has been modulated and the received pulse signal.

Range gate setting means 205 is a digital circuit for setting the sampling timing of the received pulse signal, and is provided in the control section 101 (refer to FIG. 1). The range gate setting means 205, based on the transmission timing of the above-mentioned transmission pulse signal, sets a range gate to determine the sampling timing of the received pulse signal at intervals of a predetermined time period.

Sampling means 206 is the A/D converter 110 (refer to FIG. 1) for sampling the received pulse signal, and makes a sampling of the received pulse signal in the frequency up zone or in the frequency down zone of the frequency modulated signal in each range gate set by the range gate setting means 205.

Measurement time changing means 207 is a software that is installed on the signal processing section 112 (refer to FIG. 1), sets a measurement data used as an input of Fourier transform based on the sampling data having been obtained by the sampling mans 206, and when letting the time period required to make a sampling of all measurement data a measurement time period, the measurement time period is changed every range gate.

Distance and relative velocity calculation means 208 is a software that is installed on the signal processing section 112 (refer to FIG. 1), and calculates the distance to the target 203 and the relative velocity thereof with the beat signal generated by the receiving means 204.

As described above, the radar device according to this embodiment is a radar device of FM pulse system including the frequency modulation means 201 for making a frequency modulation of a frequency of a transmission radio wave with a modulation signal of a triangular wave; the transmission means 202 of generating a pulsed signal which frequency has been modulated by the frequency modulation means 201 to transmit the pulsed signal to a target 203 as a transmission pulse signal; the receiving means 204 for receiving the signal having been reflected at the target 203 as a received pulse signal, and generating a beat signal from a frequency difference between a part of the transmission radio wave of which frequency has been modulated and the received pulse signal; and distance and relative velocity calculation means 208 for calculating a distance to the target 203 and a relative velocity with the beat signal generated by the receiving means 204. This radar device includes: the range gate setting means 205 for setting a range gate of determining a sampling timing of the received pulse signal at intervals of a predetermined time period based on a transmission timing of the transmission pulse signal; the sampling means 206 for sampling the received pulse signal in a frequency up zone or in a frequency down zone of the frequency modulated signal in each range gate set by the range gate setting means 205; and the measurement time changing means 207 for setting a measurement data used as an input of Fourier transform based on sampling data obtained by the sampling means 206, and when letting a time period required to make a sampling of all measurement data a measurement time period, changing the measurement time period in each said range gate.

As a result, according to this embodiment, by changing the measurement time period every range gate, the optimum distance resolution and relative velocity resolution can be set based on the distance to the target.

Furthermore, in the measurement time changing means 207 of the radar device according to this embodiment, the measurement time period is changed by changing the number of sampling data used as the measurement data.

Moreover, in the measurement time changing means 207 of the radar device according to this embodiment, the measurement data is generated by thinning out and selecting the sampling data, and when the number of measurement data used in Fourier transform is constant, the measurement time period is changed by changing the number of being thinned out.

In addition, in the measurement time changing means 207 of the radar device according to this embodiment, an addition of plural numbers of sampling data is made to generate the measurement data, and when the number of measurement data used in Fourier transform is constant, the measurement time period is changed by changing the number of addition.

Furthermore, in the measurement time changing means 207 of the radar device according to this embodiment, the measurement time is made long in the short distance range gate, and the measurement time period is made short in the long distance range gate.

Moreover, in the measurement time changing means 207 of the radar device according to this embodiment, the measurement time period of the long distance range gate is made 1/2n (n is a natural number) the measurement time period of the short distance range gate.

In addition, in the measurement time changing means 207 of the radar device according to this embodiment, such a setting that the number of measurement data is 2n (n is a natural number) is made.

Further, the radar device according to this embodiment employs FFT for Fourier transform.

Furthermore, in the measurement time changing means 207 of the radar device according to this embodiment, the measurement data is set using the sampling data at the central portion in the frequency up zone or in the frequency down zone as a reference.

Embodiment 2

The arrangement of a radar device according to this embodiment is almost the same as that in the above-illustrated FIG. 1.

Only the parts different from those of the first embodiment are hereinafter described.

Figure 12:
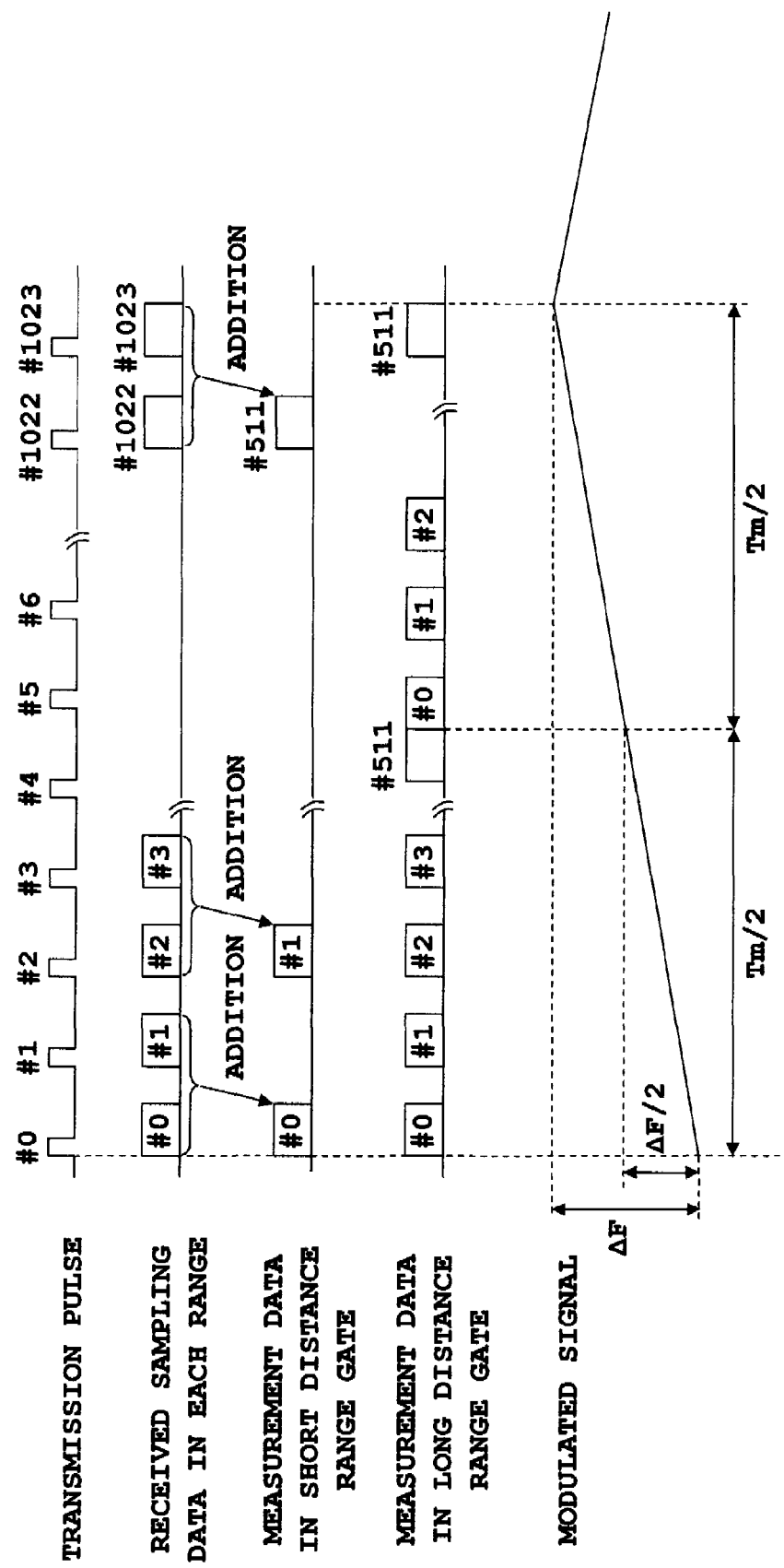
FIG. 12 is a diagram illustrating the relationship between a measurement data and a modulated signal in a second embodiment.

FIG. 12 is a diagram illustrating the relationship between a measurement data and a modulated signal in each range gate according to the second embodiment.

In this example, range gates are largely divided into two parts of a short distance range gate and a long distance range gate. For example, the range gate 0, 1 is to be the short distance range gate, and the range gate 2 to N is to be the long distance range gate.

Further, FIG. 12 illustrates the case of the up phase.

In the short distance range gate, sampling data (#0 to #1023) that are obtained all over the up phase region are used as a measurement data; and in the long distance range gate, two sets of sampling data (#0 to #511) in the range half that of the up phase are prepared and used as a measurement data.

As a result, in the short distance range gate, the measurement time period is Tm and the modulation width $\Delta F$; and in the long distance range gate, the measurement time period is Tm/2 and the modulation width is $\Delta F/2$.

Figure 13:
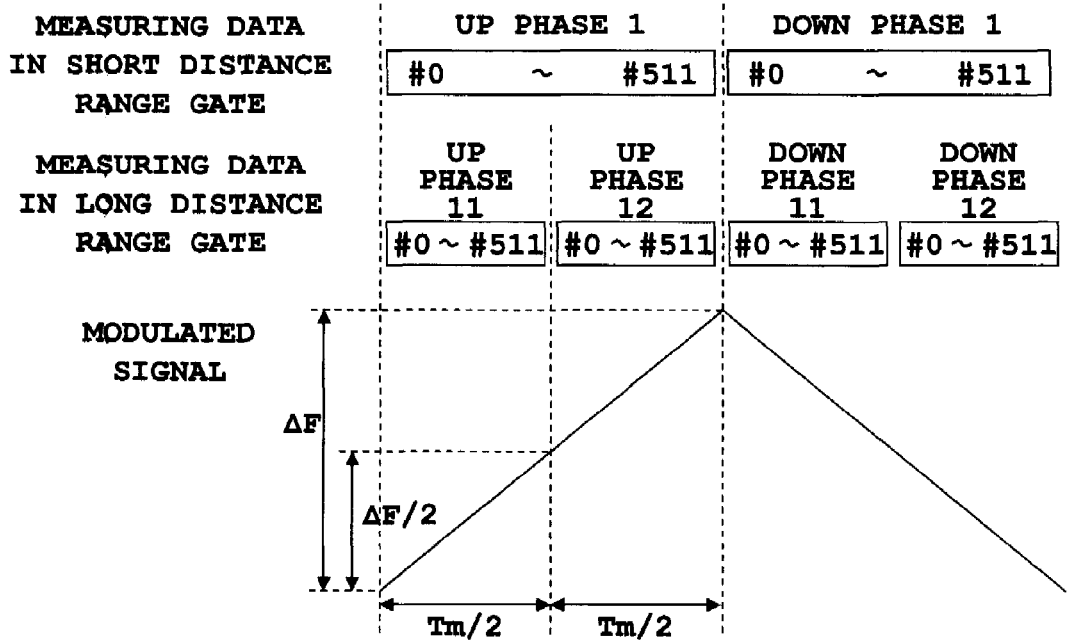
FIG. 13 is a diagram illustrating another example of the relationship between a measurement data and a modulated signal in the second embodiment.

In the long distance range gate, as illustrated in FIG. 13, in each of the up phase and the down phase, two sets of measurement data (for example, measurement data of the down phase 11 and the up phase 12) can be obtained.

Figure 14:
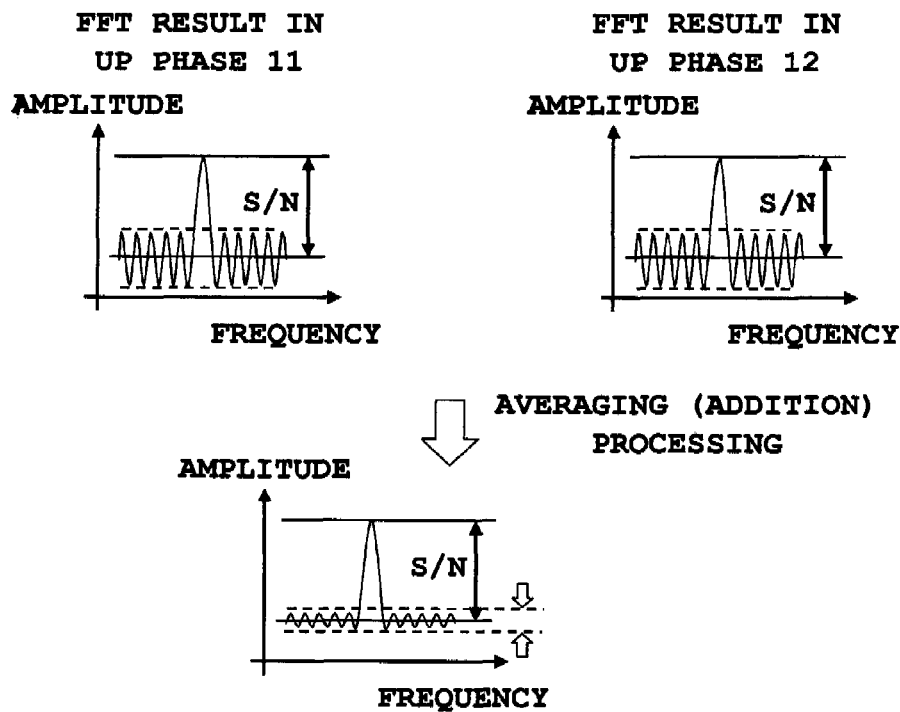
FIG. 14 is graphic diagrams for explaining a peak detection processing in the second embodiment.

In this embodiment, in the peak detection processing in S704 having been described on the above-described first embodiment, for each phase, averaging processing or addition processing of frequency transform results (FFT results) of the two sets of measurement data is executed, to make a detection processing (refer to FIG. 14).

As described above, according to this embodiment, the target detection is conducted after making the addition or averaging procedure of the amplitude or electric power of the frequency transform results having been obtained using plural sets of measurement data, so that variations (fluctuations) in the amplitude or the electric power of a noise component comes to be smaller. Thus, in the case of setting a detection threshold at a predetermined false alarm rate, a still lower threshold can be set, thus enabling to improve a detection performance.

In addition, in this embodiment, although the number of sampling data being divided is two and two sets of measurement data are prepared, it is desirable that this number of division is 2n (n is a natural number).

The reason thereof is that, for example, in the case where the number of all sampling data is 1024, by setting the division number to be 2n, FFT can be executed for frequency transform, and thus the processing load can be reduced.

Furthermore, it is preferable to prepare plural sets of the up phase and the down phase.

Figure 15:
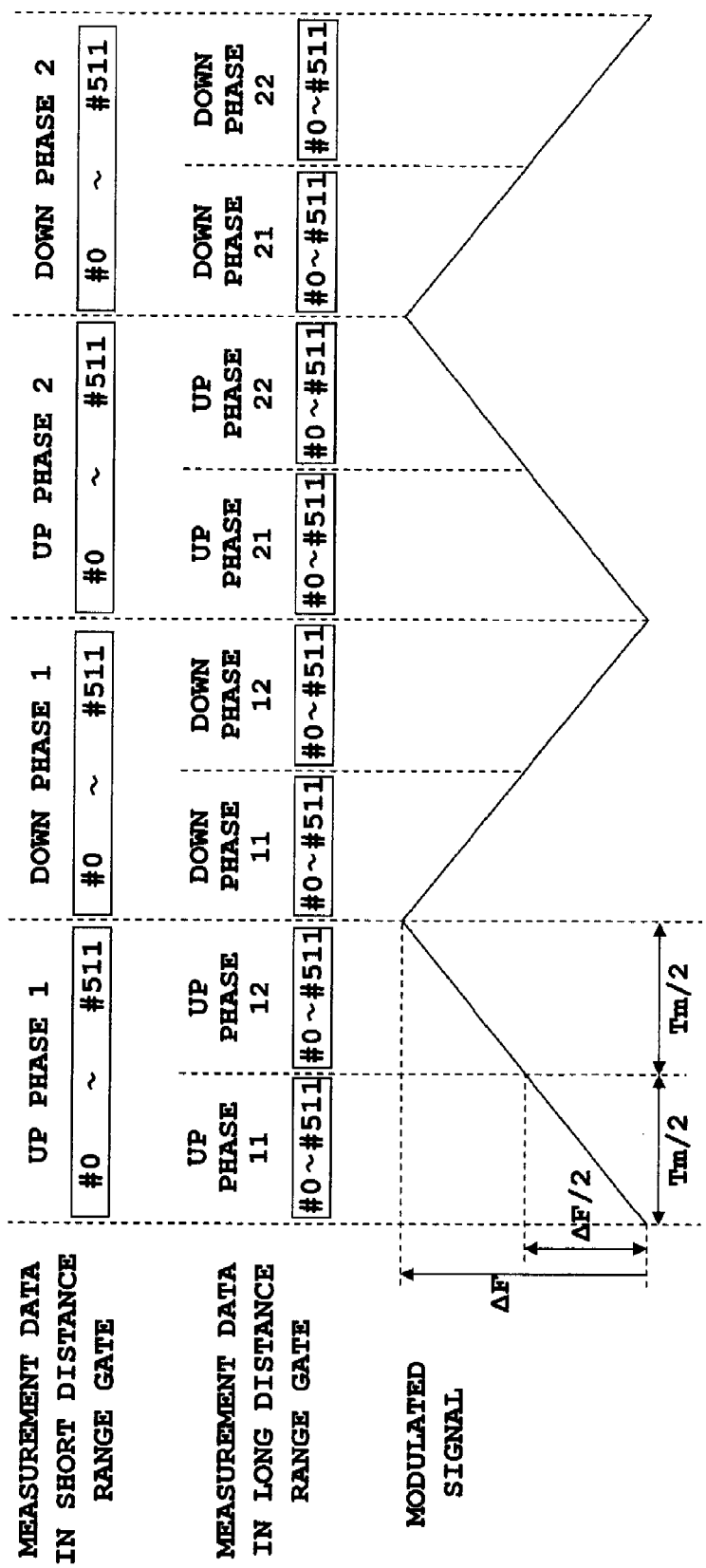
FIG. 15 is a diagram illustrating a further example of the relationship between a measurement data and a modulated signal in the second embodiment.

FIG. 15 illustrates an example in which two sets of the up phase and the down phase are set.

In this case, all frequency transform results (FFT results) with the use of measurement data of two sets of phases are processed to be averaged and added.

Since a noise component is uncorrelated, by the execution of averaging processing or addition processing of frequency transform results (FFT results), variations (fluctuations) in the amplitude or the electric power of the noise component comes to be even smaller. In the case of setting a detection threshold at a predetermined false alarm rate, a still lower threshold can be set, and thus a detection performance can be improved.

Figure 16:
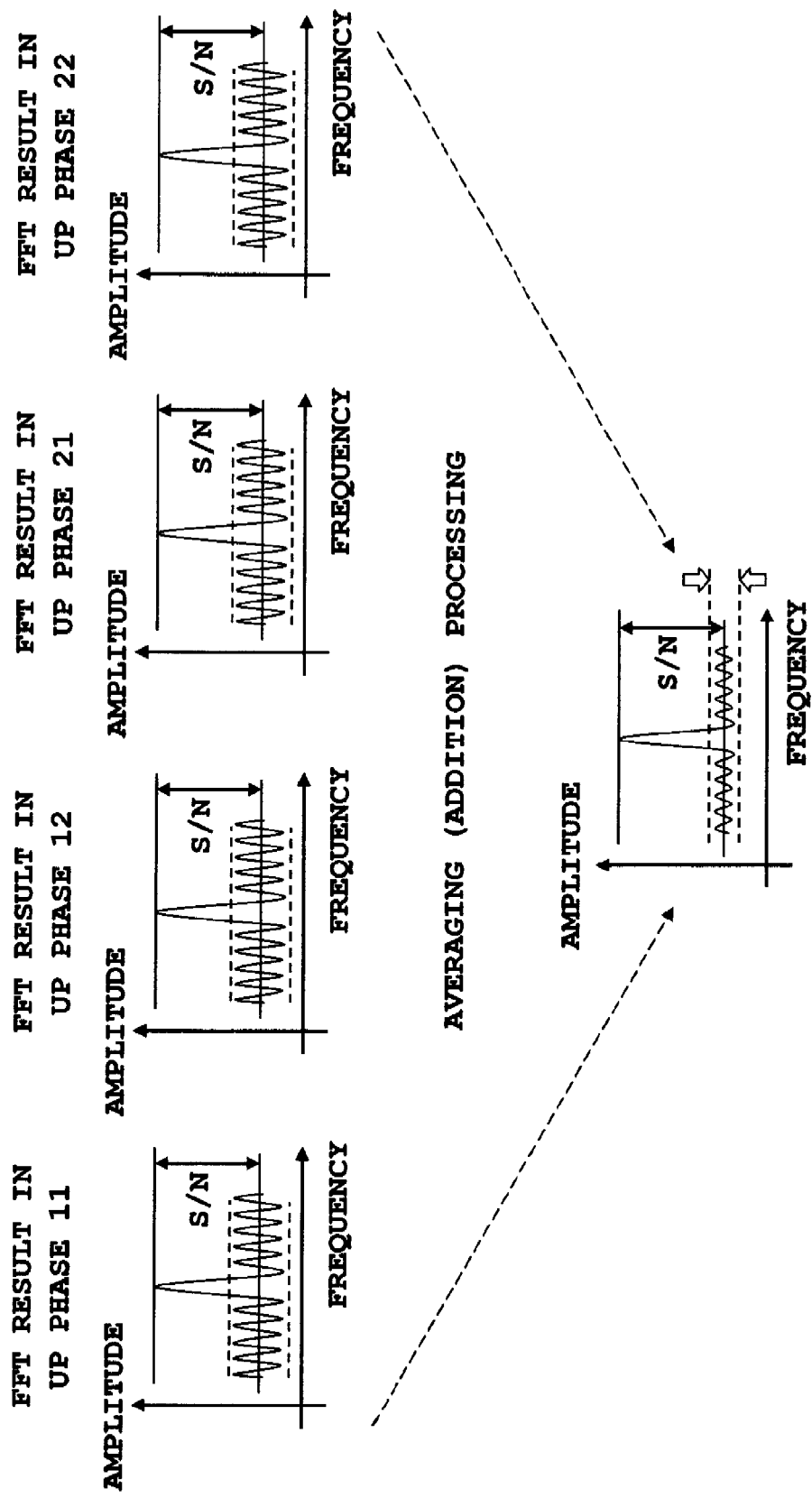
FIG. 16 is diagrams for explaining another example of a peak detection processing in the second embodiment.

FIG. 16 illustrates the case where FFT results with the use of measurement data of two sets of up phases are processed to be averaged or added, to make a peak detection processing.

As described above, in the radar device according to this embodiment, with respect to the radar device according to the above-described first embodiment, there is further provided: target detection means (not illustrated) for determining the presence or absence of target detection from Fourier transform results; and in which the measurement time changing means 207 divides the sampling data into plural parts, and sets plural sets of measurement data; and the target detection means makes an addition or averaging of an amplitude or an electric power of respective Fourier transform results having been obtained using plural sets of measurement data, and thereafter makes a target detection.

Additionally, in the radar device according to this embodiment, the measurement time changing means 207 makes the number of division of the sampling data 2n (n is a natural number)

Embodiment 3

The arrangement of a radar device according to this embodiment is almost the same as that in the above-illustrated FIG. 1.

Only parts different from those of the first embodiment are hereinafter described.

Figure 17:
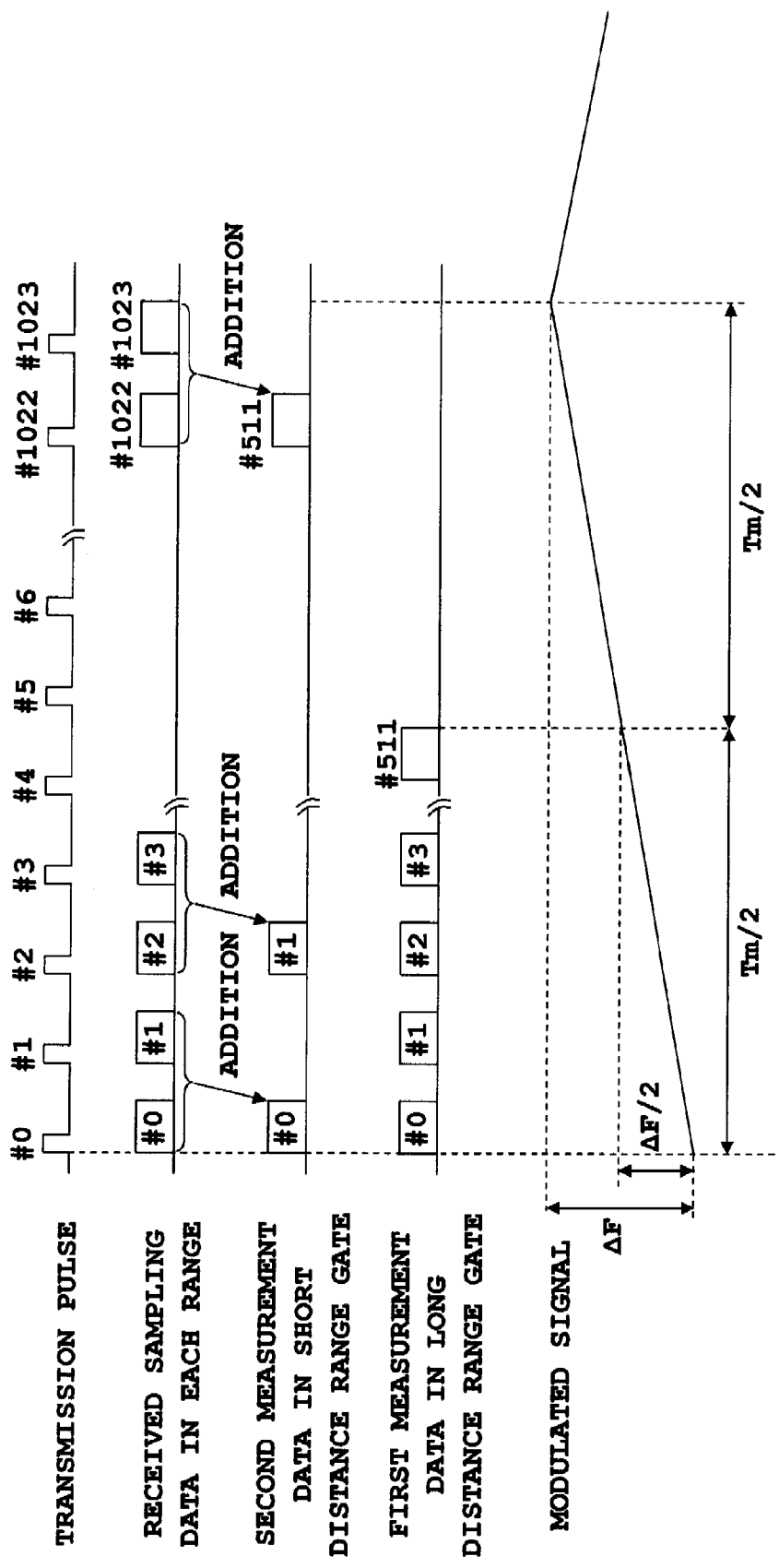
FIG. 17 is a diagram for explaining the relationship between a measurement data and a modulated signal in a third embodiment.

FIG. 17 illustrates the relationship between a measurement data and a modulated signal in the long distance range gate.

As described above, when a higher distance resolution $\Delta R$ and relative velocity resolution $\Delta V$ are set to be high, while an improved accuracy can be achieved, there is a possibility of occurrence of range over.

To cope with this, first, such a first measurement data as to be in a measurement time period of raising no range over is set, and a distance and a relative velocity are calculated. Then, based on the value of the distance and the relative velocity having been calculated, a second measurement data is set.

For example, in the case of a small relative velocity, a Doppler shift comes to be smaller. Therefore, the range over is unlikely to occur, and thus a still longer measurement time period can be set.

FIG. 17 shows an example in which the measurement time period of the first measurement data is Tm/2 (modulation width=$\Delta F$/2), and the measurement time period of the second measurement data is Tm (modulation width=$\Delta F$).

For example, when the number of FFT points is 512, $\Delta F$=150 [MHz], Tm=7 [ms], fc=76.5 [GHz], c=3×108 [m/s] and "there is present a target of R=200 m and V=0 km/h], in setting of the first measurement data, $$\Delta R = 2 \ [m], \Delta V = 2 \ [km/h],$$

so that there will be a peak at Ubin=100 and Dbin=100.

Furthermore, in setting of the second measurement data, $$\Delta R = 1 \ [m], \Delta V = 1 \ [km/h],$$

so that there will be a peak at Ubin=200 and Dbin=200.

Thus, there is no occurrence of range over.

Accordingly, first, the first measurement data is set and the distance and the relative velocity are calculated, and based on those results, the second measurement data having such a long measurement data as to raise no range over is set, whereby the accuracy can be improved while the occurrence of rang over being prevented.

Figure 18:
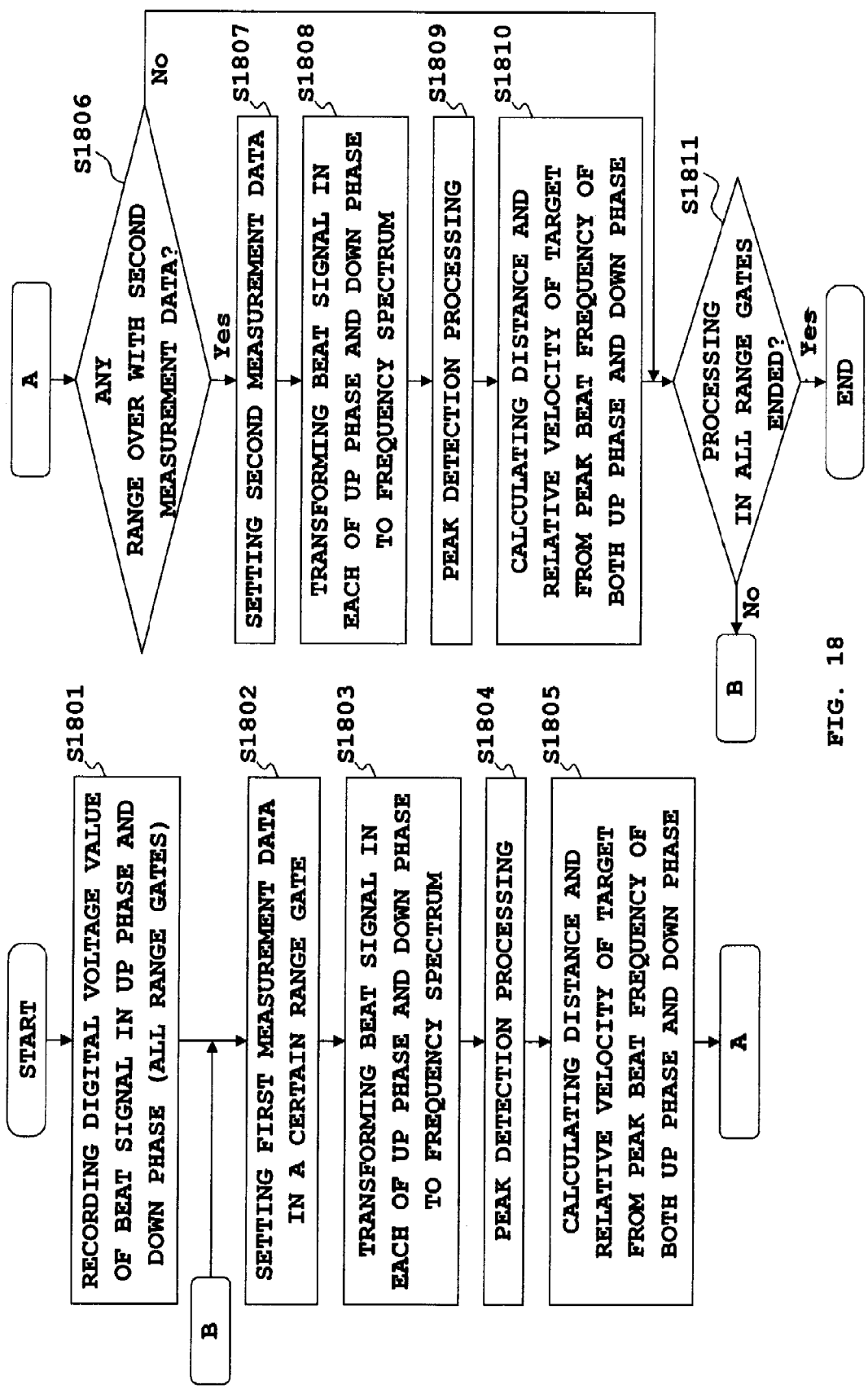
FIG. 18 is a flowchart for explaining a signal processing in the third embodiment.

Now, the flow of a signal processing in this embodiment is described with reference to the flowchart of FIG. 18.

First, in Step S1801, in the timing having been described referring to FIG. 3, a beat signal in the up phase and in the down phase is sampled in each range gate, to record a digital voltage value thereof.

Subsequently, in Step S1802, for a certain range gate, first measurement data is set.

In Step S1803, with respect to the measurement data having been set in Step S1802, for example, FFT (Fast Fourier Transform) is executed, to transform it to a frequency spectrum. It is preferable that, for the frequency transform, DFT (Discrete Fourier transform) is employed.

In Step 1804, amplitude or electric power of the frequency spectrum having been obtained in Step S1803 is calculated, and a detection threshold of assuming a predetermined false alarm rate is set. The frequency having a larger amplitude or electric power than the detection threshold is to be a peak beat frequency.

Alternatively, it is preferable to let a frequency that is larger than the detection threshold as well as is the maximum value a peak beat frequency.

In Step S1805, the distance from the peak beat frequency in both up phase and down phase to the target and the relative velocity is calculated.

The range gate is set to be within a predetermined distance range, so that it is checked whether or not the distance having been calculated is within the distance range of the range gate of observation. In the case of being within the range, a formal registration as an object is made; and in the case of being out of the range, no registration is made.

In Step S1806, based on the distance and the relative velocity having been calculated in Step S1805, it is checked whether or not no range over occurs when the second measurement data is used.

When it is determined that no range over occurs, the operation goes to Step S1807. When it is determined that any range over occurs, the operation goes to Step S1811.

Incidentally, in the case where a plurality of targets are present in the same range gate, with respect to all the targets, the presence or the absence of range over is checked.

In Step S1807, the second measurement data is set. In Step A1808, with respect to the measurement data having been set, for example, FFT (Fast Fourier Transform) is executed to transform it to a frequency spectrum.

In Step S1809, the amplitude or the electric power of the frequency spectrum having been obtained in Step S1808 is calculated, and a detection threshold of assuming a predetermined false alarm rate is set. The frequency having a larger amplitude or electric power than the detection threshold is to be a peak beat frequency.

Alternatively, it is preferable to let the frequency that is larger than the detection threshold as well as is the maximum value a peak beat frequency.

In Step 1810, the distance from the peak beat frequency both in up phase and down phase to the target and the relative velocity are calculated.

The range gate is set to be within a predetermined distance range, so that it is checked whether or not the distance having been calculated is within the distance range of the range gate of observation. In the case of being within the range, a formal registration as an object is made; and in the case of being out of range, no registration is made.

In Step 1811, it is checked whether or not the processing is ended (completed) over all range gates. In the case of not being ended, the operation goes to Step 1802. In the case of being ended, the processing comes to end.

As described above, in this embodiment, the measurement time changing means 207 sets a first measurement data used as an input of Fourier transform, and based on the distance and the relative velocity having been calculated using this first measurement data, sets a second measurement data.

That is, according to this embodiment, as a result that first, the first measurement data is set and the distance and the relative velocity are calculated, and based on these results, the second measurement data having such a long measurement time period as to raise no range over is set, the accuracy can be improved while the occurrence of rang over being prevented.

Incidentally, in this embodiment, on the assumption of the case of applying FFT to frequency transform, an example is described in which the measurement time period corresponding to the second measurement data is twice the measurement time period corresponding to the first measurement data. In the case of applying DFT to frequency transform, it is preferable that based on the calculation results of the distance and the relative velocity using the first measurement data, the measurement time period of the second measurement data is set to be as long as possible to prevent the occurrence of range over.

Embodiment 4

The arrangement of a radar device according to this embodiment is almost the same as that in the above-illustrated FIG. 1.

Only parts different from those of the first embodiment are hereinafter described.

This embodiment is characteristic in the aspect that a measurement time period is set based on the relative velocity having been calculated at the last (previous) observation.

In the case where the relative velocity having been calculated at the last observation is comparatively large, there is a possibility of range over, and thus a measurement data having a short measurement time period is set.

Figure 19:
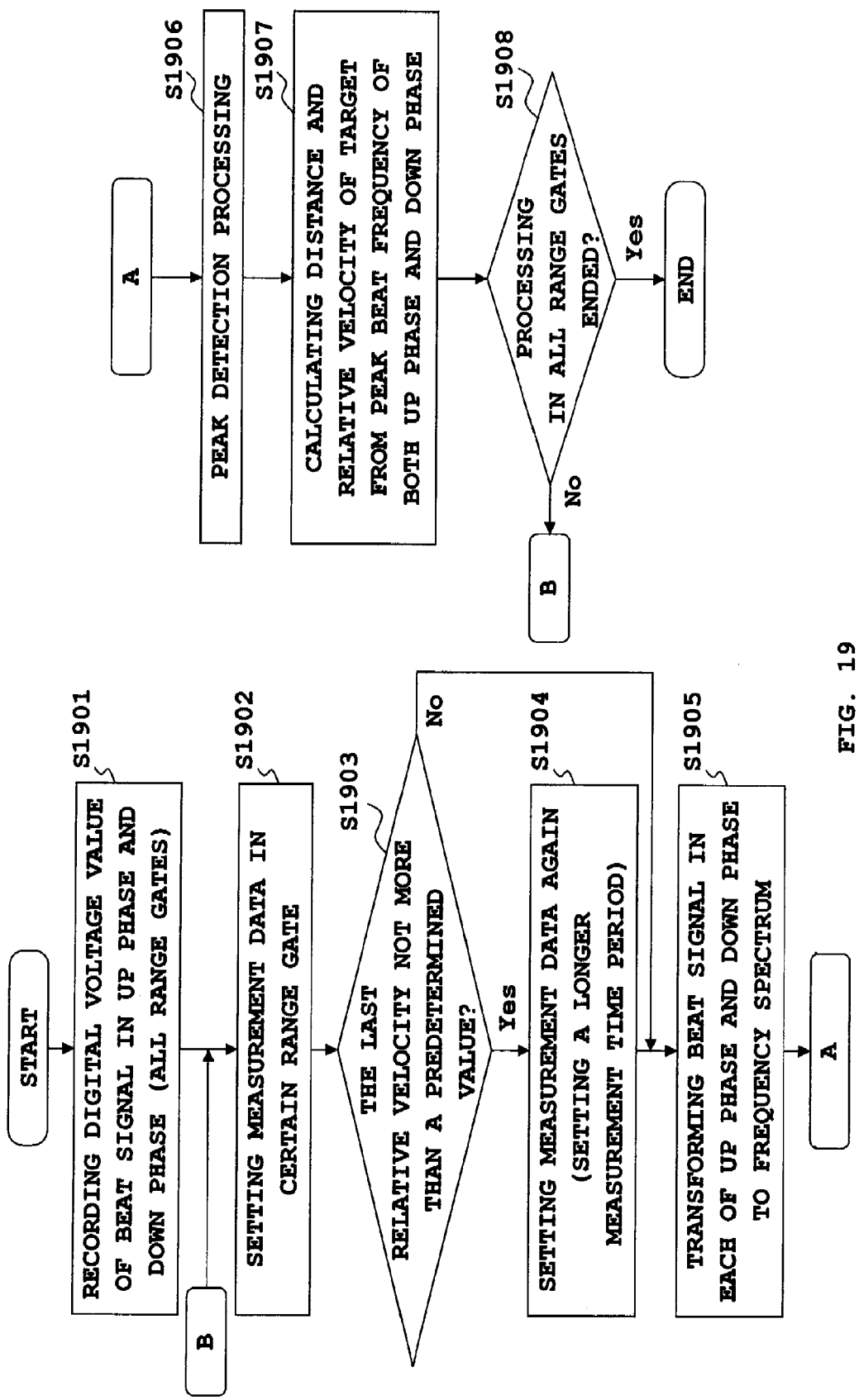
FIG. 19 is a flowchart for explaining a signal processing in a fourth embodiment.

FIG. 19 is a flowchart for explaining a signal processing in this embodiment.

First, in Step 1901, in the timing having been described referring to FIG. 3, a beat signal in the up phase and in the down phase is sampled in each range gate, to record a digital voltage value thereof.

In Step 1902, measurement data for a certain range gate is set (for example, Tm/2).

In Step 1903, the relative velocity value having been calculated at the last time is checked. In the case where the relative velocity having been calculated at the last observation is not more than a predetermined threshold, the operation goes to Step S1904, in view of considering accuracy as important, such a measurement data as to have a long measurement time period (for example, Tm) is set. In the other cases, the operation goes to Step S1905.

Incidentally, in the case where a plurality of targets are present in the same range gate, with respect to all the targets, the relative velocity having been calculated at the last observation is checked.

In Step S1905, with respect to the measurement data having been set in Step S1902 or S1904, for example, FFT (Fast Fourier Transform) is executed to transform is to a frequency spectrum. It is preferable that, for the frequency transform, DFT (Discrete Fourier transform) is employed.

In Step S1906, the amplitude or the electric power of the frequency spectrum having been obtained in Step S1905 is calculated, and a detection threshold of assuming a predetermined false alarm rate is set. The frequency having a larger amplitude or electric power than the detection threshold is to be a peak beat frequency.

Alternatively, it is preferable to let the frequency that is larger than the detection threshold as well as is the maximum value a peak beat frequency.

In Step 1907, the distance from the peak beat frequency in both up phase and down phase to the target and the relative velocity is calculated.

The range gate is set to be within a predetermined distance range, so that it is checked whether or not the distance having been calculated is within the distance range of the range gate of observation. In the case of being within the range, a formal registration as an object is made; and in the case of being out of range, no registration is made.

In Step 1908, it is checked whether or not the processing is ended (completed) over all range gates. In case of not being ended, the operation goes to Step 1902; and in the case of being ended, the processing comes to end.

As described above, according to this embodiment, the measurement time period is set based on the relative velocity having been calculated at the last observation, whereby the accuracy can be improved while the occurrence of rang over being prevented.

Although in this embodiment, the relative velocity having been calculated at the last observation is utilized, it is preferable that the measurement time period is set based on the relative velocity having been calculated at N times of observations in the past (N is a natural number).

In this case, the history of the relative velocity in the past is taken into consideration. Thus, for example, in the case of a large relative acceleration of a target, this time, the relative velocity can be predicted and the measurement time period can be set, thus enabling to prevent the occurrence of range over more reliably.

Furthermore, it is preferable to set a measurement time period based on the distance and the relative velocity having been calculated at the last observation.

In this case, the distance is taken into consideration as well, so that the occurrence of range over can be prevented more reliably.

In addition, it is preferable to set a measurement time period based on the distance and the relative velocity having been calculated at N times of observations in the past (N is a natural number).

In this case, the history of the relative velocity in the past is taken into consideration. Thus, for example, in the case of a large relative acceleration of a target, this time, the relative velocity can be predicted as well as the measurement time period can be set, thus enabling to prevent the occurrence of range over more reliably.

As described above, the measurement time changing means 207 of the radar device according to this embodiment sets the measurement time period based on the relative velocity having been calculated in the past observation.

Furthermore, the measurement time changing means 207 sets the measurement time period based on the relative velocity having been calculated at N times of observations in the past (N is a natural number).

Moreover, the measurement time changing means 207 sets the measurement time period based on the distance and the relative velocity having been calculated in the past observation.

In addition, measurement time changing means 207 sets the measurement time period based on the distance and the relative velocity having been calculated at N (N is a natural number) times of observations in the past.

Embodiment 5

The arrangement of a radar device according to this embodiment is almost the same as that in the above-illustrated FIG. 1.

Only parts different from those of the first embodiment are hereinafter described.

This embodiment is characteristic in the aspect that a measurement time period is set based on the speed of one's own car.

In the case where the speed of one's own car is low, the car is determined to be likely to travel on open roads or to travel in traffic-jam, and considering accuracy as important, the measurement time period is set to be long. In the other cases, considering the prevention from range over as important, the measurement time period is set to be short.

Figure 20:
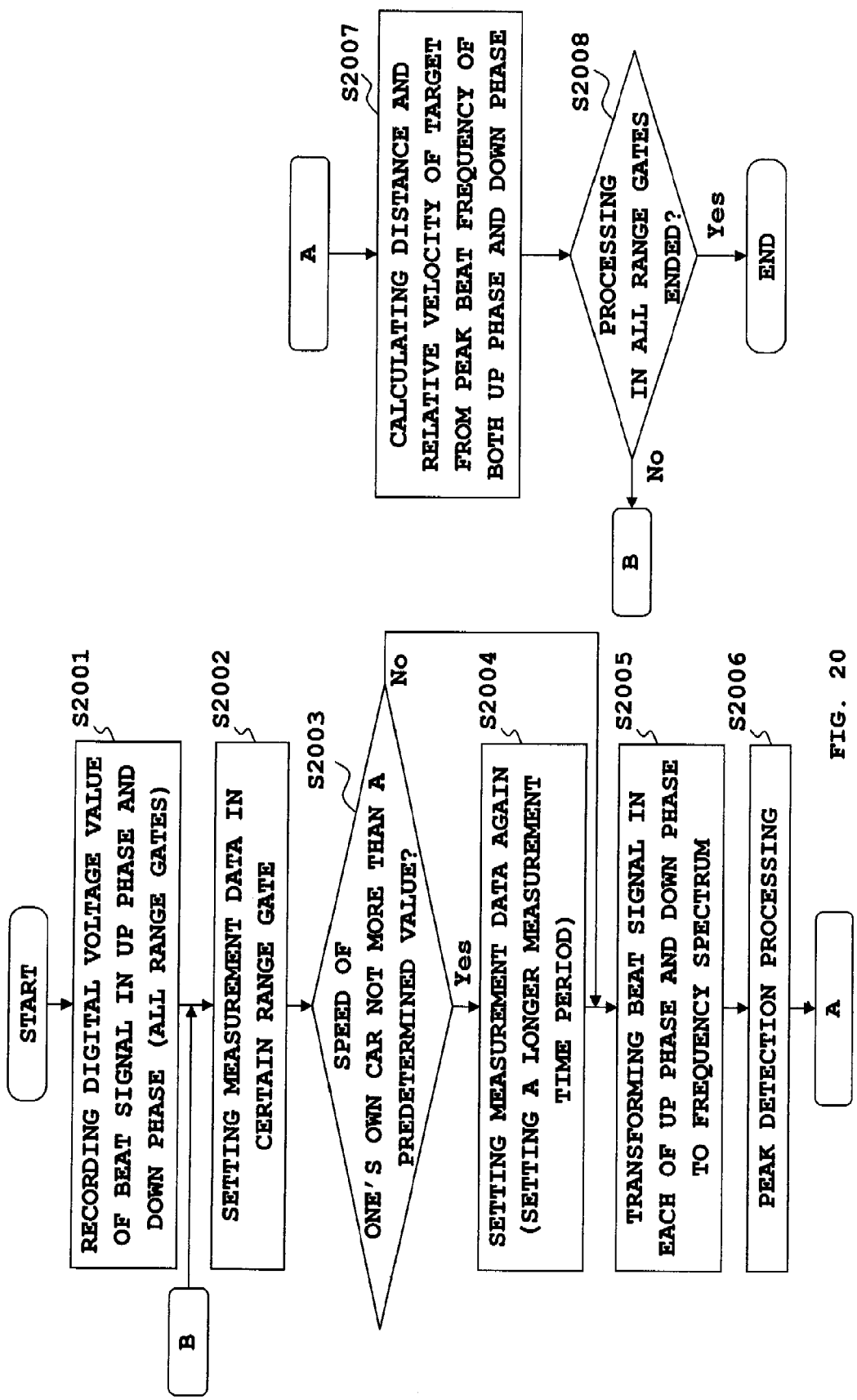
FIG. 20 is a flowchart for explaining a signal processing in a fifth embodiment.

FIG. 20 is a flowchart for explaining a signal processing in this embodiment.

First, in Step S2001, in the timing having been described referring to FIG. 3, a beat signal in the up phase and in the down phase is sampled in each range gate to record a digital voltage value thereof.

In Step 2002, measurement data for a certain range gate is set (for example, Tm/2).

In Step 2003, speed of one's own car and a predetermined threshold are compared.

In the case where the speed of one's own car is not higher than a predetermined threshold, the operation goes to Step S2004, in which measurement time period is set to be long (for example, Tm). In the other cases, the operation goes to Step S2005.

In Step S2005, with respect to the measurement data having been set in Step S2002 or in Step S2004, for example, FFT (Fast Fourier Transform) is executed, FFT (Fast Fourier Transform) is executed, to transform it to a frequency spectrum. It is preferable that, for the frequency transform, DFT (Discrete Fourier transform) is employed.

In Step 2006, the amplitude or the electric power of the frequency spectrum having been obtained in Step S2005 is calculated, and a detection threshold of assuming a predetermined false alarm rate is set.

The frequency having a larger amplitude or electric power than the detection threshold is to be a peak beat frequency.

Alternatively, it is preferable to let the frequency that is larger than the detection threshold as well as is the maximum value a peak beat frequency.

In Step S2007, the distance from the peak beat frequency in both up phase and down phase to a target and the relative velocity is calculated.

The range gate is set to be within a predetermined distance range, so that it is checked whether or not the distance having been calculated is within the distance range of the range gate of observation. In the case of being within the range, a formal registration as an object is made; and in the case of being out of the range, no registration is made.

In Step 2008, it is checked whether or not the processing is ended over all range gates. In case of not being ended, the operation goes to Step 2002. In the case of being ended, the processing comes to end.

As a result, according to this embodiment, due to that in the case of low speed of one's own car, the measurement time period is set to be still longer, accuracy of the distance and the relative velocity can be improved at the time of traveling on open roads or traveling in traffic-jam.

As described above, the measurement time changing means 207 of the radar device according to this embodiment changes the measurement time period based on the speed of one's own car.

Further, the measurement time changing means 207 sets the measurement time period long when the speed of one's own car is not higher than a predetermined speed, and sets the measurement time period short at other times.

Embodiment 6

The arrangement of a radar device according to this embodiment is almost the same as that in the above-illustrated FIG. 1.

Only parts different from those of the first embodiment are described.

A radar device according to this embodiment is characteristic in the aspect that a measurement time period is set based on information from a navigation system.

From information from the navigation system, in the case of being determined to be traveling on open roads, the measurement time period is set to be long; and in the case of being determined to be traveling on highways, the measurement time period is set to be short.

Figure 21:
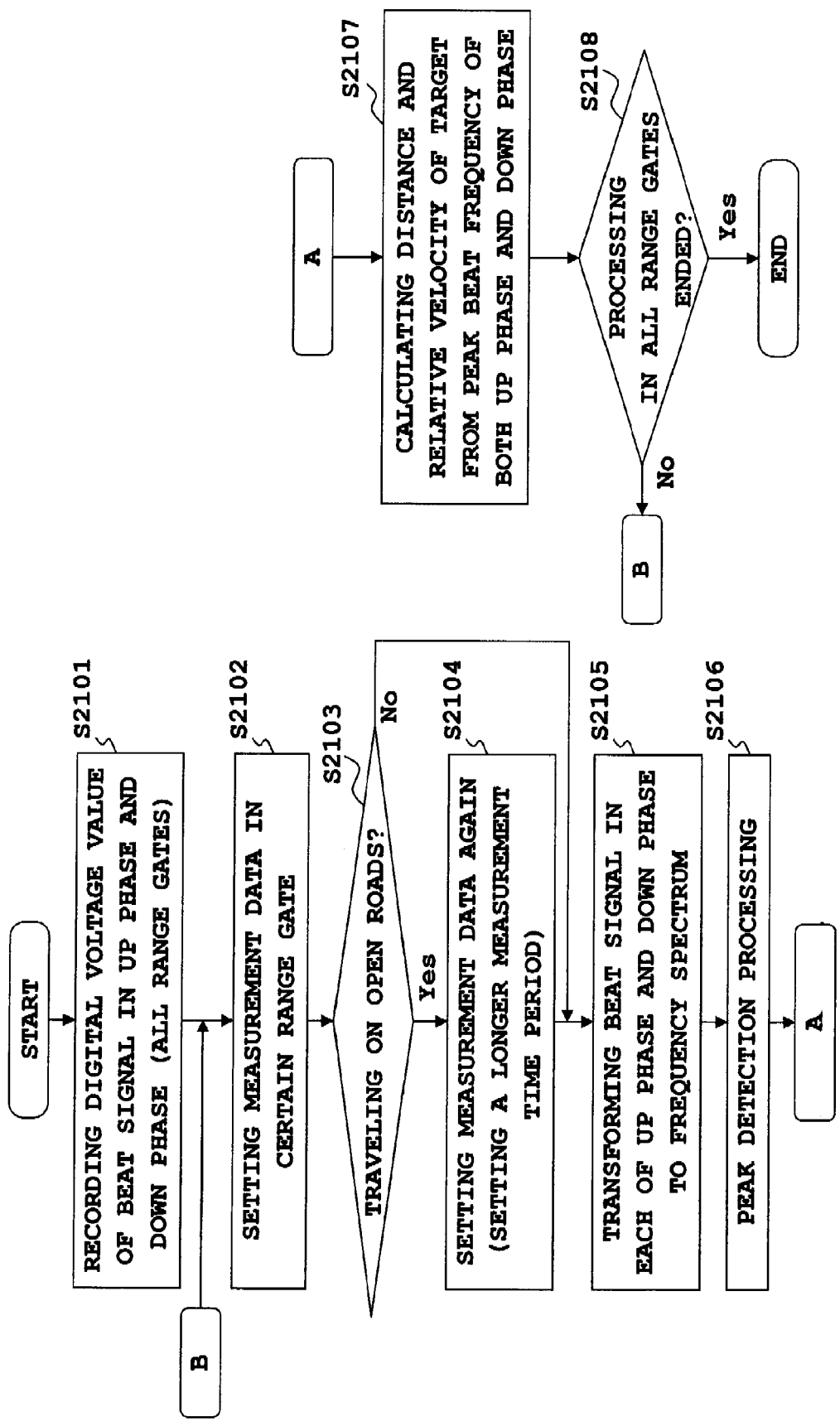
FIG. 21 is a flowchart for explaining a signal processing in a sixth embodiment.
Figure 22:
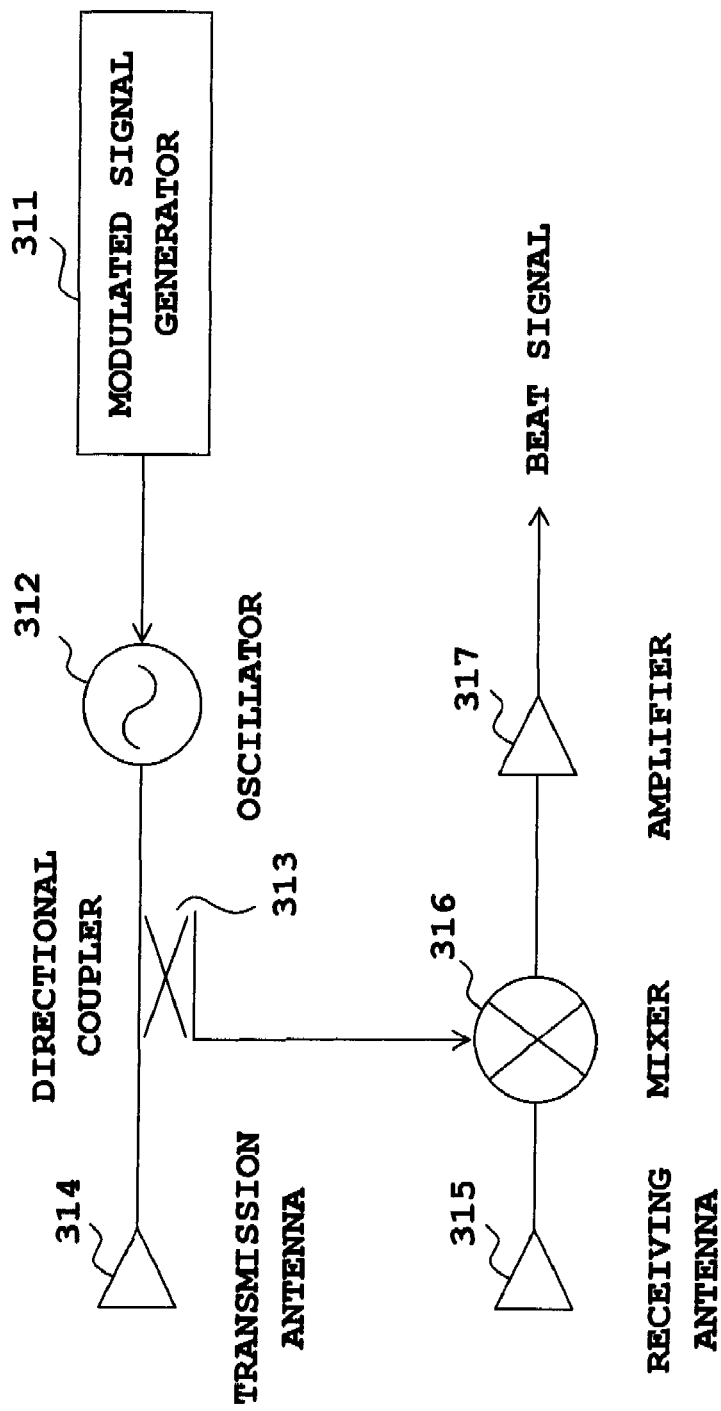
FIG. 22 is a diagram for explaining arrangement of the conventional FMCW radar.
Figure 23:
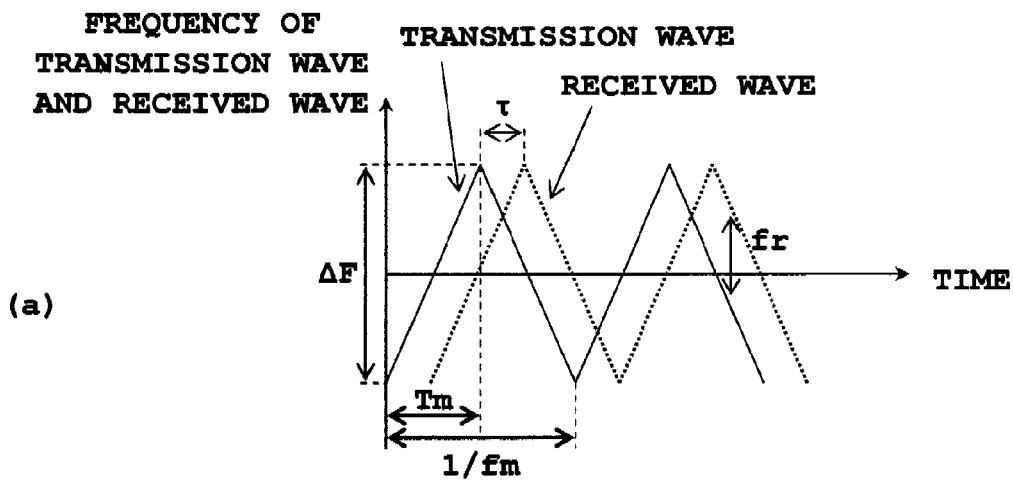
FIG. 23 are charts for explaining the operation principle of the conventional FMCW radar.
Figure 23:
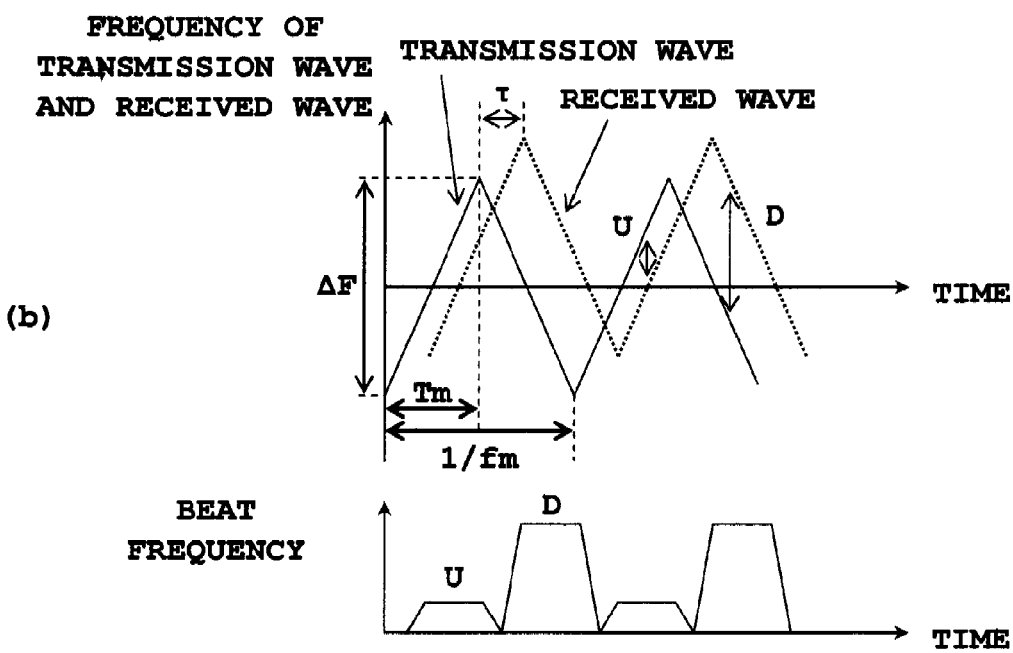

FIG. 21 illustrates a flowchart for explaining a signal processing in this embodiment.

First, in Step S2101, in the timing having been described referring to FIG. 3, a beat signal in the up phase and in the down phase is sampled in each range gate to record a digital voltage value thereof.

In Step S2102, measurement data for a certain range gate is set (Tm/2, for example).

In Step S2103, it is determined whether or not one's own car is traveling on open roads.

From information from the navigation system, in the case of being determined to be traveling on open roads, the operation goes to S2104, in which the measurement time period is set to be still longer (for example, Tm). In the other cases, the operation goes to S2105.

In Step S2105, with respect to the measurement data having been set in Step S2102 or in Step S2104, for example, FFT (Fast Fourier Transform) is executed, to transform it to a frequency spectrum. It is preferable that, for the frequency transform, DFT (Discrete Fourier transform) is employed.

In Step 2106, the amplitude or the electric power of the frequency spectrum having been obtained in Step S2005, and a detection threshold of assuming a predetermined false alarm rate is set.

The frequency having a larger amplitude or electric power than the detection threshold is to be a peak beat frequency.

Alternatively, it is preferable to let the frequency that is larger than the detection threshold as well as is the maximum value a peak beat frequency.

In Step S2107, the distance from the peak beat frequency in both up phase and down phase to a target and the relative velocity is calculated.

The range gate is set to be within a predetermined distance range, so that it is checked whether or not the distance having been calculated is within the distance range of the range gate of observation. In the case of being within the range, a formal registration as an object is made; and in the case of being out of the range, no registration is made.

In Step 2108, it is checked whether or not the processing is ended over all range gates. In case of not being ended, the operation goes to Step 2102; and in the case of being ended, the processing comes to end.

As a result, according to this embodiment, due to that in the case of being determined to travel on open roads from information from the navigation system, the measurement time period is set to be still longer, accuracy of the distance and the relative velocity can be improved.

As described above, the measurement time changing means 207 of the radar device according to this embodiment changes the measurement time period based on information from a navigation system.

Further, the measurement time changing means 207 sets the measurement time period long in the case of being determined to be traveling on open roads, while setting the measurement time period short in the case of being determined to be traveling on highways.

Embodiment 7

Although some examples of FM pulse system are shown in the foregoing Embodiments 1 to 6, it is preferable that no frequency modulation is executed and employing a mere pulse system, a measurement time period is changed every range gate. In this case, the optimum relative velocity resolution can be set for each range gate.

As described above, according to this embodiment, due to that the measurement time period can be changed every range gate; and the measurement time period is set to be long in the short distance range gate, and the measurement time period is set to be short in the long distance range gate, the optimum relative velocity resolution can be obtained both in the short distance and in the long distance.

In particular, by setting the relative velocity resolution in the short distance to be high, accuracy of the relative velocity can be improved.

Further, although the measurement time period is changed every range gate in this embodiment, it is preferable, as the most simplified example, that employing a mere pulse system, no frequency modulation is executed, but a uniform measurement time period is provided for each range gate (the measurement time period is not changed every range gate), and the mentioned measurement time period is changed based on the relative velocity, the speed of one's own car or information from the navigation system.

Even in this case, the optimum relative velocity resolution can be set.

As described above, the radar device according to this embodiment is a radar device of a pulse system in which a distance to the target 203 and a relative velocity are calculated based on a beat signal to be obtained from a frequency difference between a part of a transmission radio wave that is transmitted to a target 203 and a received pulse signal that is reflected at the target 203 and received; the radar device including: the range gate setting means 205 for setting a range gate of determining a sampling timing of the received pulse signal at intervals of a predetermined time period based on a transmission timing of the transmission pulse signal; the sampling means 206 for making a sampling for a predetermined time period in each range gate range set by the gate setting means 205; and the measurement time changing means 207 for setting a measurement data used as an input of Fourier transform based on sampling data obtained by the sampling means 206, and changing the measurement time period in each range gate when letting a time period required to make a sampling of all measurement data a measurement time period.

Further, the measurement time changing means 207 sets a first measurement data used as an input of Fourier transform, and based on the relative velocity having been calculated using the first measurement data, sets a second measurement data.

Furthermore, the radar device according to this embodiment is a radar device of a pulse system in which a distance to the target 203 and a relative velocity are calculated based on a beat signal to be obtained from a frequency difference between a part of a transmission radio wave that is transmitted to a target 203 and a received pulse signal that is reflected at the target 203 and received; the radar device including: the range gate setting means 205 for setting a range gate of determining a sampling timing of the received pulse signal at intervals of a predetermined time period based on a transmission timing of the transmission pulse signal; the sampling means 206 for making a sampling for a predetermined time period in each range gate range set by the gate setting means 205; and the measurement time changing means 207 for setting a measurement data used as an input of Fourier transform based on sampling data obtained by the sampling means 206, and changing the measurement time period based on the distance to the target 203 or the relative velocity when letting a time period required to make a sampling of all measurement data a measurement time period.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A radar device of FM pulse system including: frequency modulation means for making a frequency modulation of a frequency of a transmission radio wave with a modulation signal of a triangular wave; transmission means for generating a pulsed signal of which frequency has been modulated by said frequency modulation means, and transmitting the pulsed signal to a target as a transmission pulse signal; receiving means for receiving a signal having been reflected at said target as a received pulse signal, and generating a beat signal from a frequency difference between a part of the transmission radio wave of which frequency has been modulated and the received pulse signal; and distance and relative velocity calculation means for calculating a distance to said target and a relative velocity with the beat signal generated by said receiving means; the radar device comprising:

range gate setting means for setting a range gate that determines a sampling timing of said received pulse signal at intervals of a predetermined time period based on a transmission timing of said transmission pulse signal;

sampling means for sampling said received pulse signal in a frequency up zone or in a frequency down zone of said frequency modulated signal in each range gate set by the mentioned range gate setting means; and measurement time changing means for setting a measurement data used as an input of Fourier transform based on sampling data obtained by said sampling means, and when a time period for sampling of all measurement data is a measurement time period, changing said measurement time period in each range gate.

2. The radar device according to claim 1, wherein said measurement time changing means changes the measurement time period by changing the number of sampling data used as the measurement data.

3. The radar device according to claim 1, wherein said measurement time changing means thins out and selects the sampling data to generate the measurement data, and changes the measurement time period by changing the number of being thinned out when the number of measurement data used in Fourier transform is constant.

4. The radar device according to claim 1, wherein said measurement time changing means makes an addition of plural numbers of sampling data to generate the measurement data, and changes the measurement time period by changing the number of addition when the number of measurement data used in Fourier transform is constant.

5. The radar device according to claim 1, wherein said measurement time changing means makes the measurement time long in a short distance range gate, and makes the measurement time period short in a long distance range gate.

6. The radar device according to claim 5, wherein said measurement time changing means makes the measurement time period of the long distance range gate 1/2n (n is a natural number) the measurement time period of the short distance range gate.

7. The radar device according to claim 1, further comprising target detection means for determining the presence or absence of target detection from Fourier transform results, wherein said measurement time changing means divides the sampling data into plural parts, and sets plural sets of measurement data; and said target detection means makes an addition or averaging of an amplitude or an electric power of respective Fourier transform results having been obtained using the plural sets of measurement data, and thereafter makes target detection.

8. The radar device according to claim 7, wherein said measurement time changing means makes the number of division of the sampling data 2n (n is a natural number).

9. The radar device according to claim 1, wherein said measurement time changing means sets a fist measurement data used as an input of Fourier transform, and based on the distance and the relative velocity having been calculated using said first measurement data, sets a second measurement data.

10. The radar device according to claim 1, wherein said measurement time changing means sets the measurement time period based on the relative velocity having been calculated in the past observation.

11. The radar device according to claim 1, wherein said measurement time changing means sets the measurement time period based on the relative velocity having been calculated at N times of observations in the past (N is a natural number).

12. The radar device according to claim 1, wherein said measurement time changing means sets the measurement time period based on the distance and the relative velocity having been calculated in the past observation.

13. The radar device according to claim 1, wherein said measurement time changing means sets the measurement time period based on the distance and the relative velocity having been calculated at N (N is a natural number) times of observations in the past.

14. The radar device according to claim 1, wherein said measurement time changing means changes the measurement time period based on the speed of one's own car.

15. The radar device according to claim 14, wherein said measurement time changing means sets the measurement time period long when the speed of one's own car is not higher than a predetermined speed, and sets the measurement time period short at other times.

16. The radar device according to claim 1, wherein said measurement time changing means changes the measurement time period based on information from a navigation system.

17. The radar device according to claim 16, wherein said measurement time changing means sets the measurement time period long in the case of being determined to be traveling on open roads, and sets the measurement time period short in the case of being determined to be traveling on highways.

18. The radar device according to claim 1, wherein said measurement time changing means makes a setting such that the number of measurement data is 2n (n is a natural number).

19. The radar device according to claim 18, wherein FFT is employed for Fourier transform.

20. The radar device according to claim 18, wherein said measurement time changing means sets the measurement data using the sampling data at a central portion in a frequency up zone or in a frequency down zone as a reference.

21. A radar device of a pulse system in which a distance to the target and a relative velocity are calculated based on a beat signal to be obtained from a frequency difference between a part of a transmission radio wave that is transmitted to a target and a received pulse signal that is reflected at the target and received; the radar device comprising:

range gate setting means for setting a range gate that determines a sampling timing of the received pulse signal at intervals of a predetermined time period based on a transmission timing of the transmission pulse signal;

sampling means for making a sampling for a predetermined time period in each range gate range set by the gate setting means; and measurement time changing means for setting a measurement data used as an input of Fourier transform based on sampling data obtained by the sampling means, and changing a measurement time period in each range gate when a time period required to make a sampling of all measurement data is the measurement time period.

22. The radar device according to claim 21, wherein said measurement time changing means sets a fist measurement data used as an input of Fourier transform, and based on the relative velocity having been calculated using said first measurement data, sets a second measurement data.

23. A radar device of a pulse system in which a distance to the target and a relative velocity are calculated based on a beat signal to be obtained from a frequency difference between a part of a transmission radio wave that is transmitted to a target and a received pulse signal that is reflected at the target and received; the radar device comprising:

range gate setting means for setting a range gate that determines a sampling timing of the received pulse signal at intervals of a predetermined time period based on a transmission timing of the transmission pulse signal;

sampling means for making a sampling for a predetermined time period in each range gate range set by the gate setting means; and measurement time changing means for setting a measurement data used as an input of Fourier transform based on sampling data obtained by the sampling means, and changing a measurement time period based on the distance to said target or the relative velocity when a time period required to make a sampling of all measurement data is the measurement time period.

* * * * *